US007979633B2

(12) United States Patent
Kleiman et al.

(10) Patent No.: US 7,979,633 B2
(45) Date of Patent: Jul. 12, 2011

(54) METHOD FOR WRITING CONTIGUOUS ARRAYS OF STRIPES IN A RAID STORAGE SYSTEM

(75) Inventors: Steven R. Kleiman, Los Altos, CA (US); Rajesh Sundaram, Mountain View, CA (US); Douglas P. Doucette, Freeland, WA (US); Stephen H. Strange, Mountain View, CA (US); Srinivasan Viswanathan, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 994 days.

(21) Appl. No.: 10/817,212

(22) Filed: Apr. 2, 2004

(65) Prior Publication Data
US 2004/0205387 A1 Oct. 14, 2004

Related U.S. Application Data

(62) Division of application No. 10/105,034, filed on Mar. 21, 2002, now Pat. No. 7,200,715.

(51) Int. Cl.
*G06F 12/16* (2006.01)
(52) U.S. Cl. .......................... 711/114; 711/155
(58) Field of Classification Search .................. None
See application file for complete search history.

(56) References Cited

U.S. PATENT DOCUMENTS

| 3,876,978 A | 4/1975 | Bossen et al. |
|---|---|---|
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,805,098 A | 2/1989 | Mills et al. |
| 4,817,035 A | 3/1989 | Timsit |
| 4,825,403 A | 4/1989 | Gershenson et al. |

(Continued)

FOREIGN PATENT DOCUMENTS
JP 2001-154811 6/2001
(Continued)

OTHER PUBLICATIONS

Anvin, Peter H, "*The Mathematics of RAID 6*," Dec. 2004.
(Continued)

*Primary Examiner* — Than Nguyen
(74) *Attorney, Agent, or Firm* — Cesari and McKenna, LLP

(57) ABSTRACT

The invention features a method for controlling storage of data in a plurality of storage devices each including storage blocks, for example, in a RAID array. The method includes receiving a plurality of write requests associated with data, and buffering the write requests. A file system defines a group of storage blocks, responsive to disk topology information. The group includes a plurality of storage blocks in each of the plurality of storage devices. Each data block of the data to be written is associated with a respective one of the storage blocks, for transmitting the association to the plurality of storage devices.

25 Claims, 11 Drawing Sheets

U.S. PATENT DOCUMENTS

| | | | |
|---|---|---|---|
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schillling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,283,880 | A | 2/1994 | Marcias-Garza |
| 5,305,326 | A | 4/1994 | Solomon et al. |
| 5,351,246 | A | 9/1994 | Blaum et al. |
| 5,410,667 | A | 4/1995 | Belsan et al. |
| 5,442,752 | A | 8/1995 | Styczinski |
| 5,459,842 | A | 10/1995 | Begun et al. |
| 5,471,640 | A | 11/1995 | McBride |
| 5,506,977 | A * | 4/1996 | Jones .......................... 711/155 |
| 5,537,567 | A | 7/1996 | Galbraith et al. |
| 5,579,475 | A | 11/1996 | Blaum et al. |
| 5,623,595 | A | 4/1997 | Bailey |
| 5,778,426 | A * | 7/1998 | DeKoning et al. ............ 711/122 |
| 5,805,788 | A | 9/1998 | Johnson |
| 5,812,753 | A | 9/1998 | Chiariotti |
| 5,819,292 | A | 10/1998 | Hitz et al. |
| 5,860,003 | A | 1/1999 | Eidler et al. |
| 5,860,091 | A | 1/1999 | DeKoning et al. |
| 5,862,158 | A | 1/1999 | Baylor et al. |
| 5,884,098 | A | 3/1999 | Mason, Jr. |
| 5,948,110 | A * | 9/1999 | Hitz et al. ......................... 714/6 |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,101,568 | A | 8/2000 | Richardson |
| 6,138,126 | A | 10/2000 | Hitz et al. |
| 6,138,201 | A | 10/2000 | Rebalski |
| 6,148,368 | A | 11/2000 | DeKoning |
| 6,158,017 | A | 12/2000 | Han et al. |
| 6,195,727 | B1 | 2/2001 | Islam et al. |
| 6,223,300 | B1 | 4/2001 | Gotoh |
| 6,233,648 | B1 | 5/2001 | Tomita |
| 6,289,356 | B1 | 9/2001 | Hitz et al. |
| 6,298,415 | B1 | 10/2001 | Riedle |
| 6,480,969 | B1 * | 11/2002 | Hitz et al. ......................... 714/6 |
| 6,490,664 | B1 | 12/2002 | Jones et al. |
| 6,532,548 | B1 | 3/2003 | Hughes |
| 6,581,185 | B1 | 6/2003 | Hughes |
| 6,988,219 | B2 * | 1/2006 | Hitz et al. ......................... 714/6 |
| 6,993,701 | B2 * | 1/2006 | Corbett et al. ................ 714/770 |
| 7,254,813 | B2 | 8/2007 | Leong et al. |
| 2003/0037281 | A1 * | 2/2003 | Hitz et al. ......................... 714/6 |
| 2003/0182348 | A1 | 9/2003 | Leong et al. |
| 2003/0182349 | A1 | 9/2003 | Leong et al. |

FOREIGN PATENT DOCUMENTS

| | | |
|---|---|---|
| JP | 2001-188658 | 6/2001 |
| WO | WO 93/13478 | 7/1993 |
| WO | WO 94/29795 | 12/1994 |
| WO | WO 94/29796 | 12/1994 |

OTHER PUBLICATIONS

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14$^{th}$ VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques*," in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., High Performance RAIT, *Tenth NASA Goddard Conference on Mass Storage Systems and Technologies and Nineteenth IEEE Symposium on Mass Storage Systems*, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack, et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27- Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKROM—"About RAID 6".

Tweten, David, *Hiding Mass Storage Under UNLX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

"Complaint for Patent Infringement and Demand for Jury Trial", filed Sep. 5, 2007 in United States District Court for the Eastern District of Texas, Lufkin Division. Civil Action No. 9:07CV206, 18 pages.

"Defendant Sun Microsystems, Inc.'s Answer and Counterclaim to Plaintiff Network Appliance, Inc.'s Complaint for Patent Infringement", filed Oct. 25, 2007 in United States District Court for the Eastern District of Texas, Lufkin Division. Civil Action No. 9:07CV206, 64 pages.

"Network Appliance's Reply to Sun's Answer and Counterclaims", filed Dec. 7, 2007 in United States District Court for the Northern District of California, San Francisco Division. Case No. 3:07-CV-06053-EDL, 39 pages.

"Defendant-Counterclaim Plaintiff Sun Microsystems, Inc.'s Preliminary Invalidity Contentions and Accompanying Document Production for U.S. Patent No. 7,200,715" filed Mar. 6, 2008 in United States District Court for the Northern District of California, San Francisco Division. Case No. 3:07-CV-06053-EDL, 99 pages.

Shirrif et al. "Sawmill: A High Bandwidth Logging File System", Proceedings of the USENIX Summer 1994 Technical Conference—vol. 1, published in 1994, 12 pages.

Uysal et al. "A Modular, Analytical Throughput Model for Modern Disk Arrays", Published in the Ninth International Symposium on Modeling, Analysis and Simulation of Computer and Telecommunication Systems (MASCOTS-2001), Aug. 15-18, 2001, Cincinnati, Ohio, USA, 10 pages.

Wilkes et al. "The HP AutoRAID Hierarchical Storage System", ACM Transactions on Computer Systems, vol. 14, No. 1, Feb. 1996, pp. 108-136.

Gibson, Garth A. "Redundant Disk Arrays: Reliable, Parallel Secondary Storage", published by the MIT Press, Cambridge, Massachusetts, 1992, 26 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

David Hitz et al. TR 3002 File System Design for an NFS File Server Appliance, published by Network Appliance, Inc., Mar. 1995.

Chen Peng et al. "The Design of High Performance Control System in RAID" Computing in High Energy Physics Aug. 31, 1998, pp. 1-8, Chicago, IL.

European Search Report, Examiner D. Mazur, Apr. 3, 2005.

Anvin, Peter H. "The Mathematics of RAID 6" Dec. 2004.

Auspex 4Front NS2000, System Architecture, Network-Attached Storage for a New Millennium, Auspex Engineering Technical Report Jan. 24, 1999.

Bestavros, Azer et al. "Reliability and Performance of Parallel Disks", Technical Memorandum 45312-891206-01TM, AT&T, Bell Laboratories, Department 45312, Holmdel NJ, Dec. 1989.

Bitton, Dina, Disk Shadowing, Proceedings of the 14th VLDB Conference, LA, CA 1988.

Bultman, David L., "High Performance SCSI Using Parallel Drive Technology", In Proc. BUSCON Conf., pp. 40-44, Anaheim, CA, Feb. 1988.

Chen, Peter et al., "Two Papers on RAIDs". Technical Report, CSD-88-479, Computer Science Division, Electrical Engineering and Computer Sciences, University of California at Berkeley (1988).

Chen, Peter M. et al., RAID: High Performance, Reliable Secondary Storage, ACM Computing Surveys, 26(2): 145-185, Jun. 1994.

Chen, Peter M. et al. Maximizing Performance in a Striped Disk Array, Proc. 1990 ACM SIGARCH 17th Intern. Symp. On Comp. Arch., Seattle, WA, May 1990, pp. 322-331.

Chen Peter M. et al., "An Evaluation of Redundant Arrays of Disks Using an Amdahl 5890", Performance Evaluation, pp. 74-85, 1990.

Chervenak, Ann L., "Performance Measurement of the First RAID Prototype", Technical Report UCB/CSD 90/574, Computer Science Division (EECS), University of California, Berkeley, May 1990.

Copeland, George et al. "A Comparison of High-Availability Media Recovery Techniques", in Proc. ACM-SIGMOD Int. Conf. Management of Data, 1989.

Courtright II, William V. et al., RAIDframe: A Rapid Prototyping Tool for RAID Systems, Computer Science Technical Report CMU-CS97-142, Carnegie Mellon University, Pittsburg, PA 15213, Jun. 4, 1997.

Evans, "The Tip of the Iceberg: RAMAC Virtual Array—Part I",Technical Support, Mar. 1997, pp. 1-4.

Gibson, Garth A. et al. "Coding Techniques for Handling Failures in Large Disk Arrays", Technical Report UCB/CSD 88/477, Computer Science Division, University of California, Jul. 1988.

Gibson, Garth A. et al. "Failure Correction Techniques for Large Disk Arrays", In Proceedings Architectural Support for Programming Languages and Operating Systems, Boston, Apr. 1989, pp. 123-132.

Gibson, Garth A., et al. "Strategic Directions in Storage I/O Issues in Large-Scale Computing", ACM Computer Survey, 28(4): 779-93, Dec. 1996.

Goldick, Jonathan S. et al., "Multi-resident AFS: An Adventure in Mass Storage", in Proceedings of the 1995 USENIX Technical Conference, pp. 47-58, Jan. 1995.

Graham, Susan L. et al., "Massive Information Storage, Management and Use" (NSF Institutional Infrastructure Proposal), Technical Report No. UCB/CSD 89/493, Jan. 1989.

Gray, Jim et al. "Parity Striping of Disc Arrays: Low Cost Reliable Storage with Acceptable Throughput", in Proceedings of the 16$^{th}$ Very Large Data Bases Conference, pp. 148-161, Brisbane, Australia, 1990.

Grimes, DW Martinez, "Two Dimensional Parity Error Correction Procedure", IBM Technical Disclosure Bulletin 2686-2689, Oct. 1982.

Grimes, DW Martinez, "Vertical Parity Generator for Two Dimensional Parity", IBM Technical Bulletin 2682-2685, Oct. 1982.

Hellerstein, Lisa et al., "Coding Techniques for Handling Failures in Large Disk Arrays", in Algorithmica vol. 2, Nr. 3, 182-208 (1994).

Hughes, James et al., "High Performance RAID, Tenth NASA Goddard Conference on Mass Storage Systems and Technologies and Nineteenth IEEE Symposium on Mass Storage Systems", Adelphi, Maryland, USA, Apr. 2002.

Johnson, Theodore et al. "Tape Group Parity Protection", IEEE Symposium on Mass Storage, pp. 72-79, Mar. 1999.

Katz, Randy H. et al., Disk System Architectures for High Performance Computing, undated.

Kent, Jack et al. "Optimizing Shadow Recovery Algorithms", IEEE Transactions on Software Engineering, 14(2):155-168, Feb. 1988.

Kim, Michelle Y., "Synchronized Disk Interleaving", IEEE Transactions on Computers, C-35(11):978-988, Nov. 1986.

Kim, Michelle et al. "Asynchronous Disk Interleaving Approximating Access Delays", IEEE Transactions on Computers, vol. 40, No. 7, Jul. 1991, pp. 801-810.

Lawlor, F.D., "Efficient Mass Storage Parity Recovery Mechanism", IBM Technical Disclosure Bulletin 24(2):986-987, Jul. 1981.

Lee, Edward K. et al., "RAID-II: A Scalable Storage Architecture for High-Bandwidth Network File Service", Technical Report UCB/CSD 92/672, Feb. 1992.

Li, Don et al., "Authors' Reply", IEEE Transactions on Communications, 46:575, May 1998.

Livny, Miron et al., "Multi-Disk Management Algorithms", in Proceedings of the ACM International Conference on Measurement and Modeling of Computer Systems (SIGMETRICS), PP. 69-77, Banff, Alberta, Canada, May 1987.

Meador, Wes E., "Disk Array Systems", Proceedings of COMPCON, 1989, pp. 143-146.

Ng, Spencer et al. "Tradeoffs Between Devices and Paths in Achieving Disk Interleaving", IEEE International Symposium on Computer Architecture, 1988, pp. 196-201.

Ng, Spencer. "Some Design Issues of Disk Arrays", Proceedings of COMPCON Spring 1989, pp. 137-142, IEEE, 1989.

Park, Arvin et al., "Providing Fault Tolerance in Parallel Secondary Storage Systems", Technical Report CS-TR-057-86, Princeton, Nov. 1986.

Patel, Arvind M., "Adaptive Cross-Parity (AXP) Code for a High-Density Magnetic Tape Subsystem", IBM Technical Disclosure Bulletin 29(6):546-562, Nov. 1985.

Patterson, D. et al. "A Case for Redundant Arrays of Inexpensive Disks (RAID)", Technical Report, CSD-87-391, Computer Science Division, Electrical Engineering and Computer Sciences, University of California at Berkeley (1987).

Patterson, D. et al, A Case for Redundant Arrays of Inexpensive Risks (RAID), SIGMOD International Conference on Management of Data, Chicago, IL, USA, Jun. 1-3, 1988, SIGMOD Record 17(3):109-16 (Sep. 1988).

Patterson, David A. et al., Introduction to Redundant Arrays of Inexpensive Disks (RAID), in IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture", catalogue, 1997.

Reddy, A.L. Narasimha et al., "An Evaluation of Multiple-Disk I/O Systems", IEEE Transactions on Computers, vol. 38, No. 12, Dec. 1989, pp. 1680-1690.

Schulze, Martin E. "Considerations in the Design of a RAID Prototype", Computer Science Divisions, Department of Electrical Engineering and Computer Sciences, University of California at Berkeley, Aug. 25, 1988.

Schulze, Martin et al., "How Reliable is a RAID?", Proceedings of COMPCON, 1989, pp. 118-123.

Shirriff, Kenneth W., Sawmill: A Logging File System for a High-Performance RAID Disk Array, CSD-95-862, Jan. 1995.

Stonebraker, Michael et al., "The Design of XPRS", Proceedings of the 14$^{th}$ VLDB Conference, Los Angeles, California (1988).

Tanabe, Takaya et al. "Redundant Optical Storage System Using DVD-RAM Library", IEEE Symposium on Mass Storage pp. 80-87, Mar. 1999.

Tweten, David. "Hiding Mass Storage Under UNIX: NASA's MSS-II Architecture", IEEE Symposium on Mass Storage, pp. 140-145, May 1990.

Guingdale, A., European Search Report for Application No. 03251802.9, Jun. 30, 2006, 3 pages.

"Sun Microsystems Inc.'s Opening Claim Construction Brief", filed on Jul. 7, 2008, in United States District Court for the Northern District of California, San Francisco, Division. Case No. 3:07-CV-06053-EDL, 43 pages.

"Plaintiff NetApp Inc.'s Reponse to Sun's Opening Claim Construction Brief", filed on Jul. 21, 2008, in United States District Court for the Northern District of California, San Francisco Division. Case No. 3:07-CV-06053-EDL, 47 pages.

"Sun Microsystems Inc.'s Reply Claim Construction Brief", filed on Aug. 1, 2008, in United States District Court for the Northern District of California, San Francisco Division. Case No. 3:07-CV-06053-EDL, 41 pages.

"Order Construing Claims", filed Sep. 10, 2008 in United States District Court, Northern District of California, San Francisco Division, Case No. 3:07-CV-06053-EDL, 60 pages.

"Order Regarding Joint Report Re: Claim Construction of 'Incore Root Inode", filed Mar. 2, 2009 in United States District Court for the Northern District of California, No C-07-06053 EDL, 2 pages.

"Defendant Sun Microsystems, Inc.'s Amended Answer and Counterclaim to Plaintiff Network Appliance, Inc.'s Complaint for Patent Infringement", filed Mar. 24, 2009 in United States District Court for the Northern District of California, No C-07-06053 EDL, 58 pages.

"NetApp, Inc.'s Amended Reply to Sun's Amended Answer and Counterclaims", filed Apr. 2, 2009 in United States District Court for the Northern District of California, No C-07-06053 EDL, 40 pages.

"NetApp, Inc.'s Second Amended Reply to Sun's Amended Answer and Counterclaims Demand for Jury Trial", filed Sep. 9, 2009 in United States District Court for the Northern District of California, San Francisco Division, No. 3:07-CV-06053-EDL, 40 pages.

"Stipulated Dismissal Without Prejudice and Order", filed Sep. 8, 2010 in United States District Court for the Northern District of California, San Francisco Division, Case No. 3:07-cv-06053-EDL, 2 pages.

"Defendant Sun Microsystems, Inc.'s Amended Answer and Counterclaim to Plaintiff Network Appliance, Inc.'s Complaint for Patent Ingringement", filed on Mar. 24, 2009 in United States District Court, Northern District of California, San Francisco Division, Case No. 3:07-CV-06053-EDL, 58 pages.

"NetApp, Inc.'s Amended Reply to Sun's Amended Answer and Counterclaims", filed on Apr. 2, 2009 in United States District Court, Northern District of California, San Francisco Division, Case No. 3:07-CV-06053-EDL, 40 pages.

"NetApp, Inc.'s Second Amended Reply to Sun's Amended Answer and Counterclaims", filed Sep. 9, 2009 in United States District Court, Northern District of California, San Francisco Division, Case No. 3:07-CV-06053-EDL, 40 pages.

* cited by examiner

FIG. 1b

STORAGE DEVICE 20A

| Block | 1 | 2 | 3 | 4 | P |
|---|---|---|---|---|---|
| 0 | X | X | X | X |   |
| 1 |   | X |   | X |   |
| 2 |   |   |   | X |   |
| 3 |   | X |   |   |   |
| 4 |   |   |   |   |   |
| 5 |   | X |   |   |   |
| 6 |   |   |   |   |   |

|   | 1 | 2 | 3 | 4 |
|---|---|---|---|---|
| 1 |   | X |   | X |
| 2 |   |   |   |   |
| 3 |   |   |   |   |
| 4 |   |   |   |   |

FIG. 6

METHOD FOR WRITING CONTIGUOUS ARRAYS OF STRIPES IN A RAID STORAGE SYSTEM

RELATED APPLICATION

This Patent is a Divisional of U.S. patent application Ser. No. 10/105,034 filed Mar. 21, 2002, now issued as U.S. Pat. No. 7,200,715 on Apr. 3, 2007.

TECHNICAL FIELD

The invention generally relates to data storage, and, more particularly, to high reliability electronic data storage in arrays of disk drives.

BACKGROUND INFORMATION

A computer system typically requires large amounts of secondary memory, such as that provided by a disk drive, to store information (e.g. data and/or application programs). As the performance of computers and associated processors has increased, disk drive performance has increased. For example, data and track density increases, magnetic media improvements, and greater numbers of heads and platters in a single disk drive result in higher data transfer rates.

Large disk drives can be very expensive, and thus lead to additional high costs when replacing a drive to obtain greater capacity or performance. Single drive systems can also have limited redundancy of stored data. Damage or replacement of a system can cause a temporary loss of access to storage services or a permanent loss of data.

Multiple drives can be coupled together in parallel to mitigate the disadvantages of single disk drive systems. Data files are broken into chunks that may be accessed simultaneously from multiple drives in parallel. One such system of combining disk drives in parallel is known as "redundant array of inexpensive/independent disks" (RAID). A RAID system can provide greater storage capacity than a large single disk drive system, but at lower cost, greater reliability and with high data transfer rates due to the parallelism of the array.

Blocks of data are written to a RAID system in the form of stripes, where a stripe includes one storage block on each disk drive in an array of disk drives in the system. Data blocks can be read simultaneously from each drive, to provide fast data accesses for large files. RAID systems also allow incremental increases in storage capacity through the addition of disk drives to the array. When a disk fails in the RAID system, it may be replaced without shutting down the entire system. Data on a failed disk may be recovered using error correction techniques.

A RAID system typically views its associated collection of disk drives as a collection of stripes in one or more groups of disk drives. A group of drives is commonly called a "RAID group". A stripe is typically implemented with a pre-defined geometry within a group. That is, each block in a stripe is located at the same offset (disk block number) relative to its disk.

RAID systems are typically defined in terms of six basic configurations, referred to as RAID level 0 through RAID level 5. Each RAID level has advantages and disadvantages. For example, in a RAID level 4 system, data comprising a plurality of blocks are stored on N data disks in a "stripe" of N storage blocks. RAID level 4 adds an extra parity disk drive containing error-correcting information for each stripe in the system.

Stripe writing presents conflicts for both file systems and disk drivers. File systems typically prefer to allocate space on a single drive for storage of related data, like that derived from a single file. This permits "read-ahead" behavior to reduce file access time by anticipating future requests. Disk drivers tend to be optimized to take advantage of the physics of disks, such as rotation rates and read/write head access times. Again, storage of related data blocks on the same disk drive is advantageous.

RAID systems tend to view disk storage blocks in terms of stripes, and handle write requests in terms of a stripe. Typically, data blocks are accumulated to create a single stripe write to reduce parity calculation overhead. When a RAID disk array manager processes stripe writes, related blocks of data can be scattered over multiple drives.

SUMMARY OF THE INVENTION

The invention generally involves methods and apparatus to improve the efficiency, access time and transfer rates of storage systems that utilize multiple storage devices. In one embodiment the invention relates to a method for managing the storage of data by a storage system having a storage operating system and in communication with a plurality of storage devices. Each storage device includes a plurality of blocks for storing data.

In one embodiment the method includes the steps of generating block layout information by a file system layer of the storage operating system by identifying which storage blocks within the plurality of blocks shall be used by a write operation for storing data; the identified blocks preferably having a high degree of locality or even being contiguous on individual disks. The method also includes transferring the block layout information from the file system layer to a RAID layer of the storage operating system, and in response to the block layout information, the RAID layer controlling the execution of the write operation to substantially minimize cost of parity calculations. Cost of parity calculation can be substantially minimized, e.g., by minimizing the number of read operations performed or substantially maximizing chain lengths of blocks read for the parity calculation.

In one embodiment, the step of controlling the write operation to substantially minimize parity calculation cost includes the steps of examining the write operation; selecting whether to substantially minimize the number of read blocks or to substantially maximize chain lengths of read blocks; and implementing the selection responsive to the block layout information. If the selection constitutes substantially minimizing the number of read blocks, then the write controlling step further includes the steps of determining on a stripe-by-stripe basis whether to calculate parity based on the subtraction method or the recalculation method and then performing any appropriate read operations to support the method selected and calculate parity. The determination is made by examining which calculation method would require the fewest read operations. On the other hand, if the selection constitutes substantially maximizing chain lengths of read blocks, then the write controlling step further includes the steps of deciding which storage blocks to read to substantially maximize chain length while minimizing the number of storage blocks read to support either the subtraction method or the recalculation method, and then perform read operations on those blocks and calculate parity.

In one embodiment, the RAID layer exports disk topology information to the file system layer. The file system layer maintains a database of topology information. The file system layer utilizes information regarding disk storage block numbers and allocation of storage blocks to prepare block layout information for a write transaction.

In another embodiment, the invention relates to a method for managing storage of data in storage blocks in a plurality of blocks. The method includes the steps of generating block layout information; and in response to the block layout information, controlling the execution of a write operation by identifying a group of storage blocks for use by the write operation so as to substantially maximize chain length within a storage device of the plurality of storage devices while substantially minimizing cost of calculation of error correction parameters by substantially using all available storage blocks in a collection of stripes. In one embodiment the calculation of error correction parameters includes the calculation of parity.

In yet another embodiment, the invention relates to a method for managing storage of data in a storage system including a plurality of storage devices each including a plurality of storage blocks. The method includes writing data to a group of storage blocks that include predetermined storage blocks across a plurality of stripes and predetermined storage blocks within each storage device. This is done in a manner that substantially maximizes chain length of storage blocks within each storage device while substantially minimizing the cost of calculation of error correction parameters for the plurality of stripes. In one embodiment, chain lengths are maximized for writes of data, and chain lengths are maximized for reads to support parity calculations.

In another embodiment, the invention relates to a storage system including a plurality of storage devices each including a plurality of storage blocks and a storage device manager in communication with the plurality of storage devices. The storage device manager writes data to a group of storage blocks, which include predetermined storage blocks across a plurality of stripes and predetermined storage blocks within each storage device so as to substantially maximize chain length of storage blocks within a storage device while substantially minimizing the cost of calculation of error correction parameters for processing of the storage of the data.

In yet another embodiment, the invention relates to a system for managing the storage of data. The system includes a plurality of storage devices each having a plurality of storage blocks, a storage device manager in communication with the plurality of storage blocks, a block layout information generator in communication with the storage device manager and the plurality of storage blocks, and an error correction parameter calculator in communication with the plurality of storage blocks and the storage device manager. The storage device manager, in response to the block layout information from the block layout information generator, controls the execution of a write transaction by identifying a group of storage blocks for use by the transaction so as to substantially maximize chain length within the storage devices while substantially minimizing cost of calculations by the error correction parameter calculator of error correction parameters for the stripes.

In still another embodiment, the invention relates to a method for managing storage of data in storage blocks. The method includes the steps of generating block layout information, dynamically determining a first number of error correction calculations, dynamically determining a second number corresponding to a chain length and, in response to the block layout information, controlling the execution of a write operation by identifying a group of storage blocks for use by the write operation so as to have a chain length of the second number within a storage device while performing the first number of calculations of error correction parameters across a stripe.

In the RAID context, some embodiments realize these advantages in part by batching write requests, allocating space in a plurality of stripes to store data of the batched requests, and writing the data to full chains of stripes. Features of the invention thus provide a balance between the desire to write vertically to individual disk drives and to write complete stripes for efficiency in parity determinations.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1b is a block diagram of an embodiment of an array of disk drives in accordance with the invention.

FIG. 5 is a block diagram of one embodiment of a RAID 4 disk drive array.

FIG. 6 is a block diagram of one embodiment of a group of storage blocks, which includes four stripes of sixteen total storage blocks.

DESCRIPTION

The terms "file", "data" and "data file" are herein understood to refer to any entity of data that may be stored and/or transferred via analog or digital means. The entity may originate in analog or digital form, and, at various times, may be stored in analog or digital form. The entity is capable of storage in electronic, electromagnetic, electro-optic, optic and other means, and is capable of transfer between two distinct physical locations via, in particular, electronic, wireless and optically based communications.

Figure 1A:
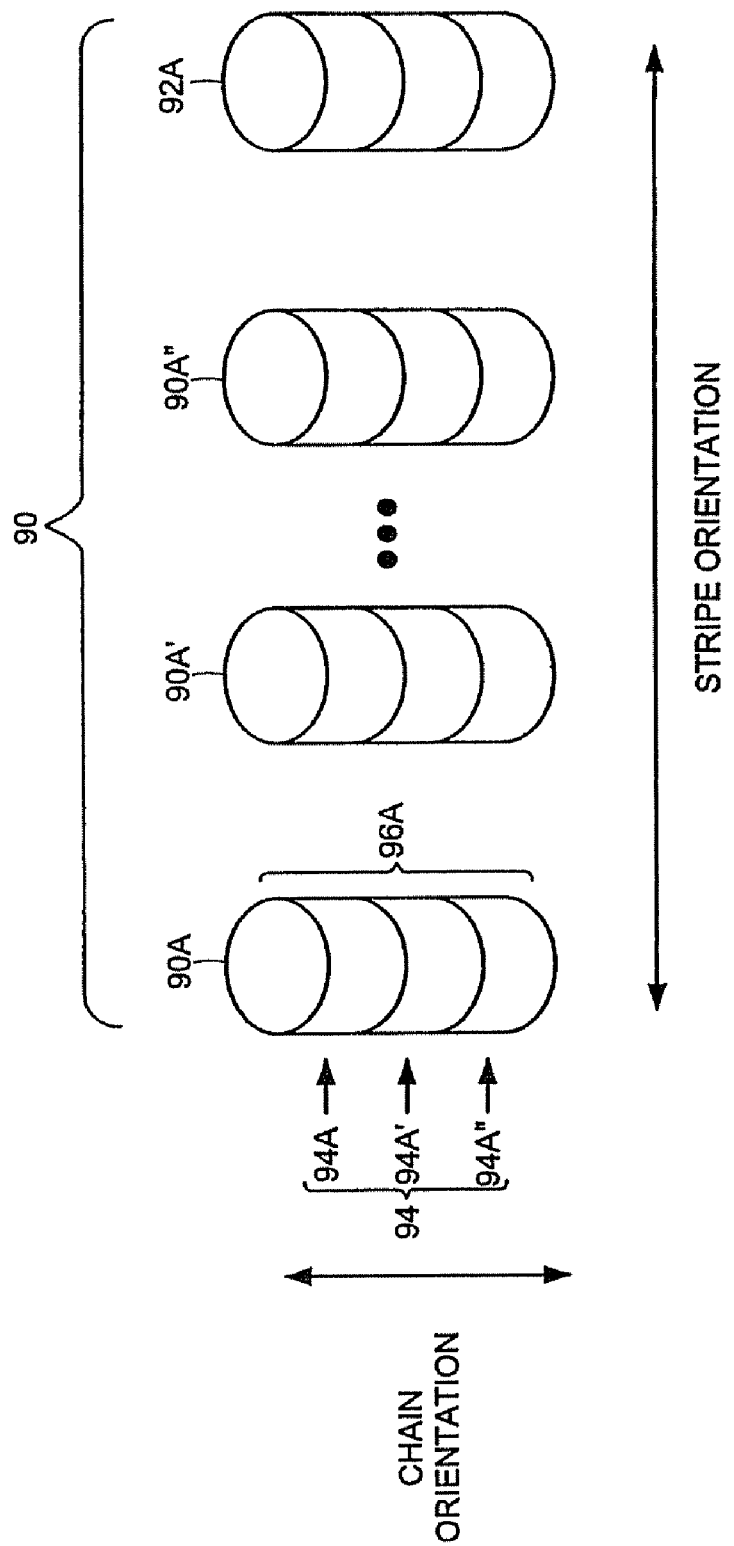
FIG. 1a is a block diagram of an embodiment of a data storage system constructed in accordance with the invention.

In brief overview and referring to FIG. 1a, one embodiment of a data storage system constructed in accordance with the invention includes a number of data storage devices or disks 90A, 90A', 90A" (generally 90) and a parity storage device or disk 92A. Each storage device includes a number of storage blocks or locations. In this figure, the devices are shown as storage disks but any random access persistent storage device such as a solid state disk may be used. Such a group of disks in one embodiment is a RAID array.

Data written to this array is written across the data disks as a series of stripes 94A, 94A' 94A" (generally 94), and the parity value for the stripes is written on parity disk 92A. In addition, the present invention permits the writing of data to a series of blocks on the same disk 90, referred to as a chain 96A. The writing of multiple blocks of data to the same disk 90 reduces the access time for that data.

Features of the invention permit optimization of storage device access and parity calculation overhead. Storage device access can be optimized by maximizing the chain length for a write transaction. Parity calculation overhead can be optimized by minimizing the number of storage blocks that must be read to update the parity disk 92A for write transactions or maximizing the chain lengths of the reads required for parity calculations.

As used herein, in one embodiment, "chaining" is reading/writing data from/to a single I/O to contiguous blocks on a disk drive, i.e., blocks whose DBN are sequential. In other embodiments, chaining is reading/writing data in a single I/O from/to blocks that may not be contiguous, but are as proximate to one another as possible, recognizing that intervening storage blocks may already be allocated or otherwise unavailable to the I/O (also known as "locality").

"Chain length" means the number of blocks contained in a chain. "Maximizing chain length" is a process of achieving the longest possible chain length on a disk, which is limited to the number of storage blocks on the disk, but may also be limited to a reasonable lesser number, e.g., in order to avoid undue latency in assembly of chains or executing the I/O or due to limitations on the availability of resources necessary to perform the I/O. Maximizing chain length can be performed for each disk separately or for all disks in combination over the entire array.

Data write requests are collected, i.e., buffered, for example, by a file system layer, to enable processing of a write transaction having a maximized chain length and having a maximum number of full stripes to be written. The file system lays out blocks of the same file sequentially (i.e., in the same order as in the file) to optimize read ahead performance during read operations processed subsequently to the current write operation.

The file system layer utilizes disk 90 topology information, received, from a RAID layer that manages the disks 90, to select the storage blocks of stripes 94 for the processing of a write transaction for the collected data write requests. The topology information can include information such as the size of disk drives, the number of disk drives in an array, and other like information. The file system layer uses the topology information in generating block layout information that associates data blocks of the buffered write requests with free storage blocks in the selected stripes, which it then allocates for a write transaction The file system layer selects storage blocks to be used in the write transaction that provide a maximum length of the chains 96A. This means that "related" sets of data blocks (that is, data blocks contained in the data buffers collected for the single write transaction) are often written to proximate storage blocks of a disk. The file system layer associates data blocks of the buffered write requests with as many as possible, and preferably all free storage blocks in the selected stripes to realize minimized parity calculations.

To complete the processing of the write transaction, the data blocks for storage (or, e.g., memory references thereto) and the block layout information are forwarded to the RAID layer. The RAID layer is thus notified that it can process a complete write transaction. Further, responsive to the block layout information, the RAID layer can execute the write transaction to minimize the cost of parity calculations for efficient I/O processing.

The RAID layer selects an appropriate parity calculation method, e.g., subtraction or re-calculation, for each of the selected stripes using what can be called the "Least Cost of Parity Calculation Method". The selection made depends on the number and location of storage blocks to which data is to be written in each stripe and the topology information. By "subtraction method" is meant a method of parity calculation for a stripe in which the prior contents of the data blocks to be written (e.g., W1, W2) and the parity data (P) for that stripe are read, and the new data blocks to be written to the stripe are obtained from the data buffer (e.g., W1', W2'). The new parity data (P') for the stripe is then calculated according to the subtraction formula:

$$P'=W1\ XOR\ W2\ XOR\ P\ XOR\ W1'\ XOR\ W2'$$

where XOR is a logical exclusive-OR operation.

By "recalculation method" is meant a method of parity calculation for a stripe in which the contents of the data blocks of the stripe other than those blocks to be written (e.g., W3, W4) are read, and the new data blocks to be written to the stripe are obtained from the data buffer (e.g., W1', W2'). The new parity data (P') for the stripe is then calculated according to the recalculation formula:

$$P'=W1'\ XOR\ W2'\ XOR\ W3\ XOR\ W4$$

Figure 1B:
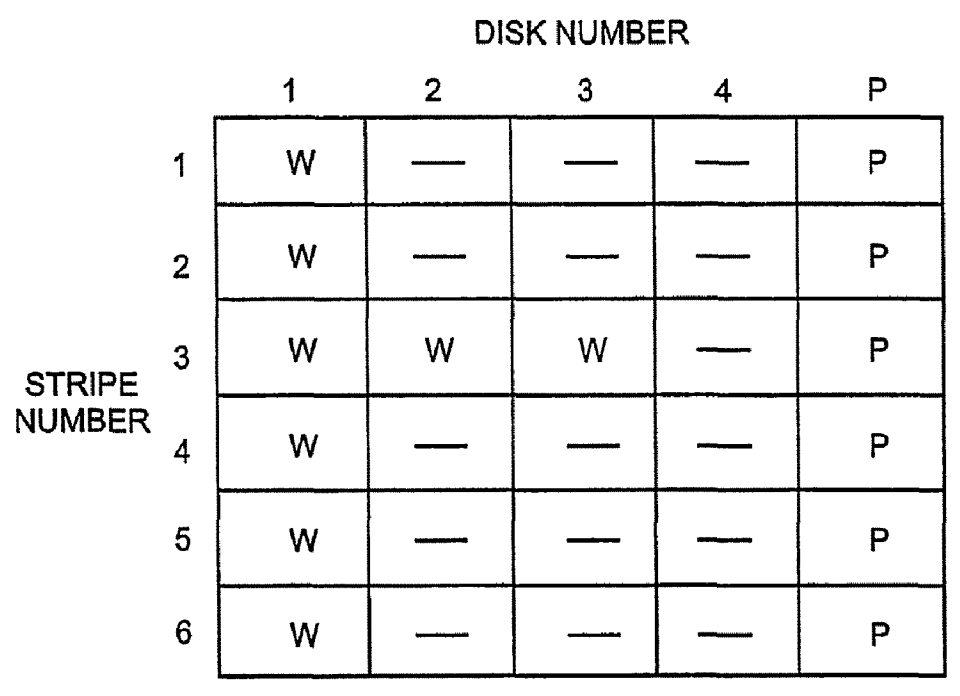

FIG. 1b, which shows one example of a disk array, shall be used to illustrate the Least Cost of Parity Calculation Method. FIG. 1b depicts a RAID array with four data storage disks and a parity disk arranged for example pursuant to RAID level 4. The disks are shown as columns in the figure, with the data disks numbered across the top as 1 through 4, and the parity disk designated P. Stripes across the array are represented as rows, and numbered along the left side as 1 through 6. Thus, a 4 by 6 grid portrays 24 data storage blocks and each stripe has an associated parity block to store parity data calculated from the contents of the data blocks within the corresponding stripe. For convenience in notation, the individual storage block, whether for data or parity, can be uniquely identified as XY, where X is the number of the block's row and Y is the number of its column within the array.

FIG. 1b also illustrates storage blocks that have been allocated for storage of data pursuant to a pending write transaction. In the drawing, the allocated storage blocks are indicated by "W", parity-containing blocks by "P" and blocks not allocated for the pending transaction by "-" (hyphen). Thus, the following blocks are to be written: 11, 21, 31, 32, 33, 41, 51 and 61, and parity data P are contained in each of the parity blocks.

Implementing the Least Cost of Parity Calculation Method in this illustrative example entails performing a number of read operations to obtain the data and parity from the array required to support the calculation. The read operations can be performed according to any of a number of alternate methodologies. The implementation can be designed to use one or another of these methodologies, or the selection of which to use can be performed dynamically during execution of write operations.

A first methodology entails determining the fewest number of read operations on a per stripe basis required to effectuate the parity calculation, while still chaining together reads from the same storage device wherever possible in one method. In this case the array is examined to ascertain the number of storage blocks in each stripe that are to be written. In each stripe, if the number to be written exceeds half the total number of storage blocks, the recalculation method is selected for use; if the number is under half, the subtraction method is selected. If exactly half, one or the other of the parity calculation methods can be selected in the implementation. In the example shown, the subtraction method is selected for rows 1 and 2, the recalculation method is selected for row 3, and the subtraction method for rows 4 through 6.

After making the selection, the parity calculation method chosen is implemented. In the illustrated example, the fewest number of read operations can be realized by reading the data and parity from the storage blocks as following:
 Read 11, 21
 Read 34
 Read 41, 51, 61
 Read 1P, 2P
 Read 4P, 5P, 6P Thus, for this example, eleven read operations composed of five chains can be used to efficiently obtain the data and parity from the array in order to calculate parity for the new write. Performing the read operations as shown minimizes processor and memory resource consumption.

A second methodology entails identifying which storage blocks to read to substantially maximize chain length while minimizing the number of blocks read and being able to calculate parity in all read stripes by either the subtraction method or the recalculation method. The parity calculation method (i.e., subtraction or recalculation) chosen are implemented so that the required read operations entail the longest chain lengths within the entire array without regard to the per stripe number of reads. In the illustrated example, the longest chain lengths for the read operations are achieved by the following read operations:
 Read 11, 21, 31, 41, 51, 61
 Read 32
 Read 33
 Read 1P, 2P, 3P, 4P, 5P, 6P Thus, for this example, fourteen read operations composed of four chains having maximal average chain length can be used to efficiently obtain the data and parity from the array in order to calculate parity for the new write. Performing the read operations as shown minimizes the total overhead for disk access.

Preferred implementations of the invention use either or both of these two alternative methodologies to perform the read operations, selecting an approach that provides the least cost for parity calculation. For example, if a system is memory constrained, the first methodology can be selected to use the least amount of memory; if a system is disk bandwidth constrained, the second methodology can be selected to reduce bandwidth usage. Thus, the invention may be practiced to perform the read operations according to either the methodology of fewest reads or the methodology of longest chain length, whichever is determined to be suitable to the system configuration.

Thus, for a disk bandwidth limited system that is not CPU or memory constrained, the RAID layer preferably maximizes chain lengths for reads required by the parity calculation by evaluating the block layout information prepared by the file system. To do this, in one embodiment, the RAID layer identifies various combinations of block chains on different disks, calculates for each combination an average or mean chain length, and specifies those blocks belonging to the combination having the longest average chain length as the ones to read during the read operation. Thus, maximizing chain length is performed for all disks in combination over the entire array.

In a preferred embodiment, the invention features a file system that supports coordinated writes to multiple stripes. The file system receives write requests and disk topology information. The file system creates the block layout information responsive to the disk topology information and the write request, and thus prepares a single I/O write transaction for processing by a RAID layer.

The block layout information associates the multiple stripes with the data to be written by the write I/O transaction. The multiple stripes include a group of storage blocks, which can be defined as a matrix or two-dimensional array of storage blocks. In one embodiment the file system collects multiple write requests into a single write I/O transaction. In another embodiment, the invention further features a RAID layer having a storage device manager that is configured, in cooperation with a file system, to accept and process writes to the arrays of storage blocks. For example, the RAID layer can process a single write transaction in response to block layout information, which specifies an association between the data to be written and a group of storage blocks that are distributed over more than one stripe.

In one embodiment, a RAID layer exports to a file system topology information to enable the file system to prepare the block layout information for a write transaction. Moreover, the file system in preferred embodiments receives and/or maintains information of allocated and unallocated storage blocks. The file system examines this information and uses it to optimize the location of blocks for writes to the RAID groups.

Figure 2:
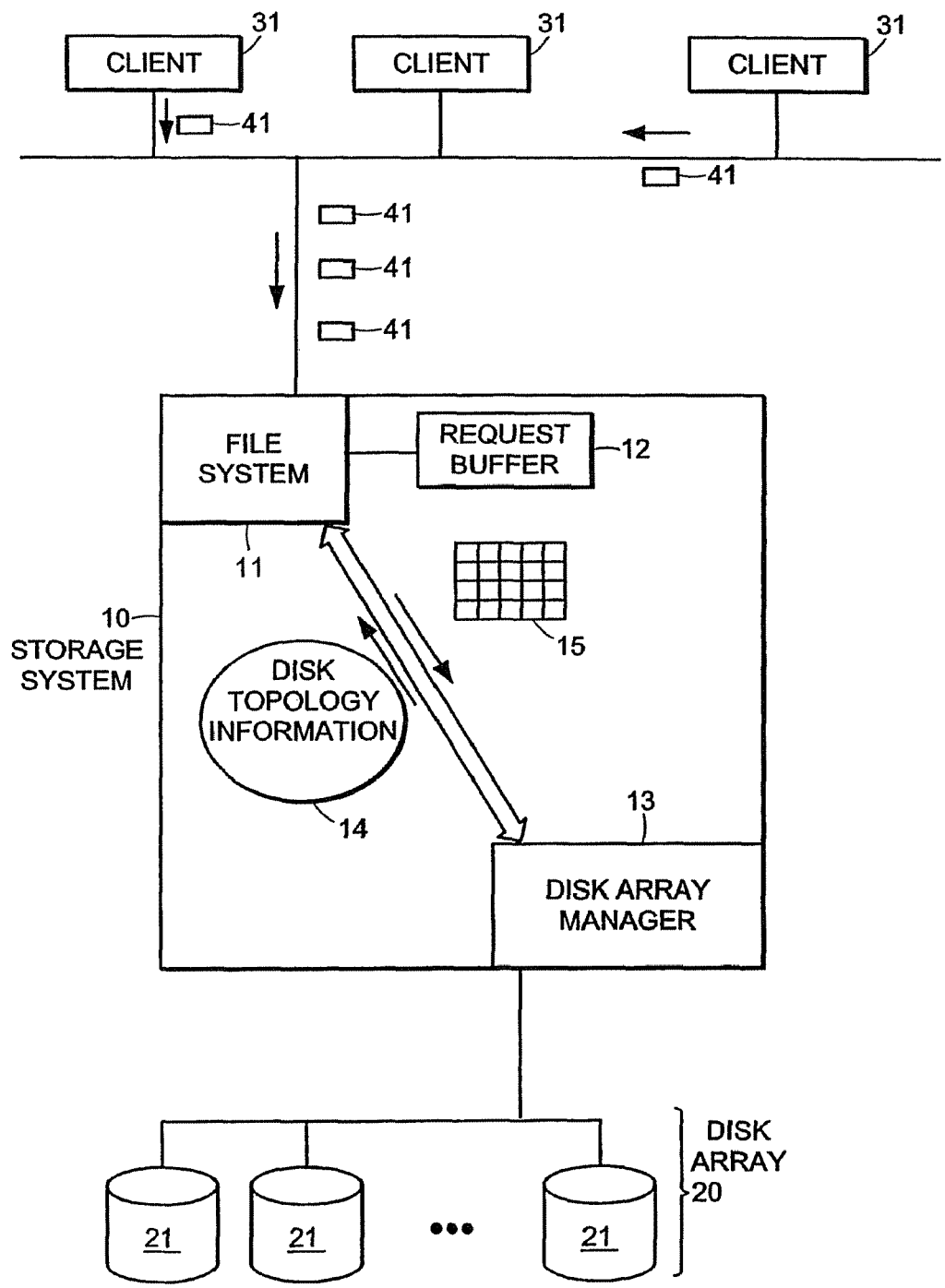
FIG. 2 is a block diagram of an embodiment of a storage system in communication with clients and an array of disk drives.

FIG. 2 illustrates an embodiment of a storage system 10, which manages storage access requests, i.e., write requests and read requests, to a disk drive array 20 that includes disk drives 21. The storage system 10 includes a file system 11, a storage request buffer 12, a disk array manager 13, storage disk topology information 14 and block layout information 15 that associates data blocks with a group of storage blocks. The array 20 can be a RAID array, with at least one of the disk drives 21 storing parity data.

The clients 31 send write requests 41 to the storage system 10. The write requests 41 identify data to be stored, or alternatively include data to be stored.

The file system 11 of the storage system 10 evaluates and manages the client I/O requests, such as the write requests 41. The write requests 41 in one embodiment are stored in the request buffer 12 prior to the performing of a single write operation to the disk array 20.

The disk array manager 13 manages access requests for the disk array 20, as an intermediary between the file system 11 and the array 20. The disk array manager 13 also provides disk array topology or configuration updates to the file system 11. The disk topology information 14 includes, for example, information about the identity of the disk drives 21 and the storage space in the drives 21 (e.g., disk size), and the identity and ordering of the disk drives in the arrays.

The disk topology information 14 preferably includes storage block identifiers such as storage block numbers. In some embodiments, the topology information 14 includes virtual block numbers (VBN) of the storage blocks, and the disk array manager 13 maintains information regarding the mapping of VBN's to disk block numbers (DBN). Any individual disk drive can preferably support multiple concurrent mappings, and not all storage space in the disk drives need be mapped.

Write requests 41 are buffered until sufficient data blocks are collected for writing to storage via a single write transaction. In preferred embodiments, write requests 41 are buffered for a single write transaction until one or more criteria are satisfied, as determined by the file system 11. For example, write requests 41 can be buffered until an optimal write transaction can be processed or until system timers indicate that a write transaction should be executed.

Then, the file system manager 11 utilizes the disk topology information 14 to construct the block layout information 15, which associates the buffered data blocks with disk storage blocks for the single write transaction. The block layout information 15 associates each data block of the buffered write requests 41 with a storage block in a group of storage blocks. More than one storage block of each disk drive 21 can be included in the group, and, optimally, more than one storage block of at least a number of disk drives 21 are included in the group to maximize chaining.

The block layout information 15 is forwarded to the disk array manager 13 for processing of the write transaction. The disk array manager 13 receives the write transaction request, which includes the block layout information 15 that identifies one or more stripes for the single write transaction. Prior art systems, in contrast, typically send single stripe write transactions to a RAID layer. Features of the invention thus enable forwarding of a complete write transaction to a RAID layer.

Figure 3:
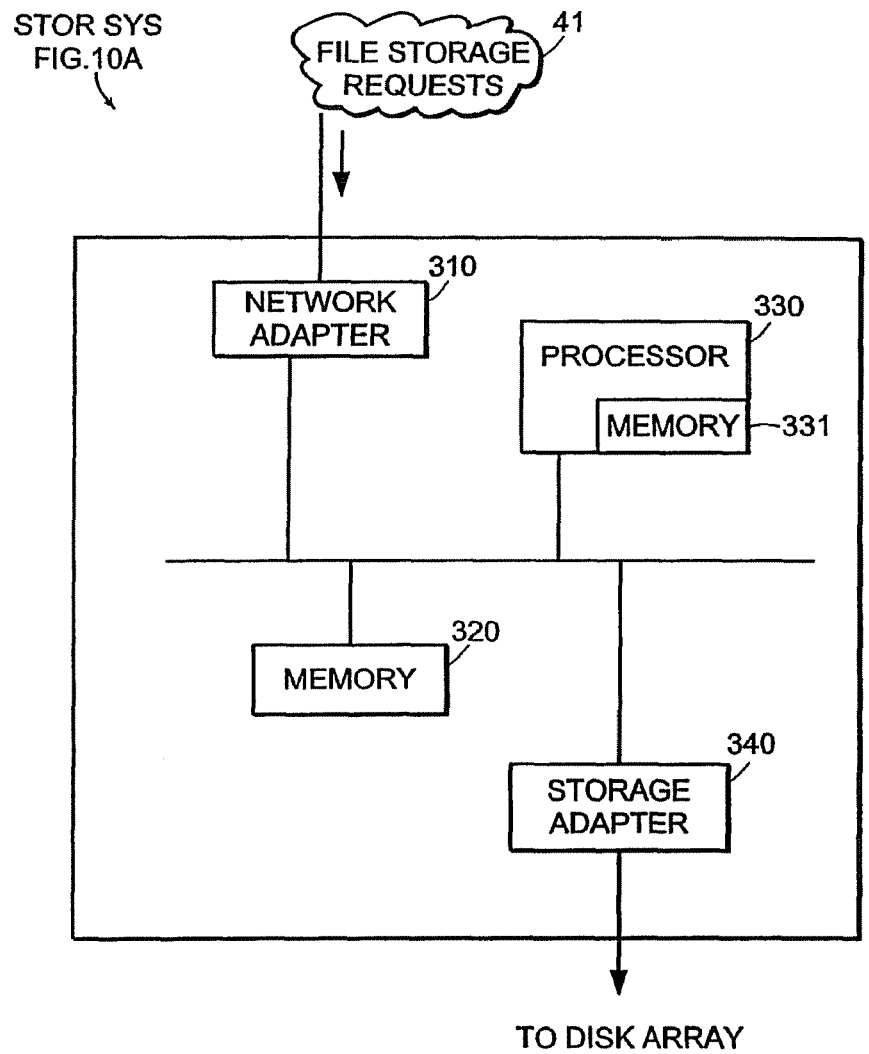
FIG. 3 is a block diagram of one embodiment of a storage system, which corresponds to an implementation of the embodiment of FIG. 1.

Referring now to FIG. 3, the file system 11 and the disk array manager 13 may be implemented in software or firmware, e.g., as a software application, part of a computer operating system or input-output device controller. They may be implemented within a single component of the storage system 10, or implemented in distinct components.

FIG. 3 illustrates an embodiment of a storage system 10A, which corresponds to an implementation of the embodiment of FIG. 1. The storage system 10A includes a network adapter 310, a processor 330 that includes memory 331, memory 320 and a storage adapter 340. The processor can support an operating system and/or applications that implement a file system 11.

The memory can store operating system, application programs, and other data. The processor 330 and adapters 310, 340 can include processing elements and/or logic circuits. For example, the processor can be a computer microprocessor integrated circuit. Other hardware, firmware and software means to implement features of the invention will be understood by those having skill in the electronic storage arts.

The network adapter 310 includes components that couple the storage system 10A to a client 31 via a network. The network may provide a direct connection, or a shared communication pathway. The client 31 and storage system 10A can implement a client/server communication model. The client 31 can then request storage services, and the system 10A can respond to the client 31, via the exchange of packets. The packets can be encapsulated by using, for example, Internet protocols or Network File System protocols.

The clients 31 can include any type of computer system, such as, for example, any personal computer, workstation, server, main frame computer or other computing device. Alternatively, a client 31 can be a portable computing device such as a PDA or cell phone. As a further alternative, the clients 31 can be any terminal (windows or non-windows based), or thin-client device operating according to a server-based computing model. The clients 31 can be operated by a human participant or user or they may function autonomously.

The clients 31 and/or the disk drives 21 can communicate with the storage system 10 via a wide-area network (WAN), such as the Internet. The storage system 10 can be implemented as a file server (also known as a filer) which can reside at a client 31 site or can be networked with its associated clients 31 via a site network such as a local-area network (LAN). The server can also reside offsite, removed from the locations of any client 31 and/or any disk drive 21.

The storage adapter 340 provides an interface to the disk array 20. Alternatively, an adapter can interface to storage devices that include other types of storage media. Storage media can include, for example, optical disks, magnetic tape, bubble memory and transistor-based random-access memory.

The storage adapter 340 cooperates with a storage operating system and/or application software executing on the processor 330 to process data requests from a client 31. The storage adapter 340 interfaces to the array 20 via, for example a high-performance, Fibre Channel serial link topology. Data written to or read from the disk drives 21 can be processed by the processor 330 and/or by the adapter 340. Data that is read can then be forwarded via the network adapter to a client 31.

The disk drive array 20 can be implemented as one or more volumes that each include storage disks that define a logical arrangement of disk storage space. Each volume can be associated with its own file system. Disk drives within a volume are typically organized as one or more groups of RAID disks. Further, the disk drives in a volume can be organized into two or more mirror, or "plex", collections of disk drives. A plex stores a mirror of data in the other plex or plexes to provide enhanced data reliability. Mirror configurations are described further with reference to FIG. 11.

Figure 4:
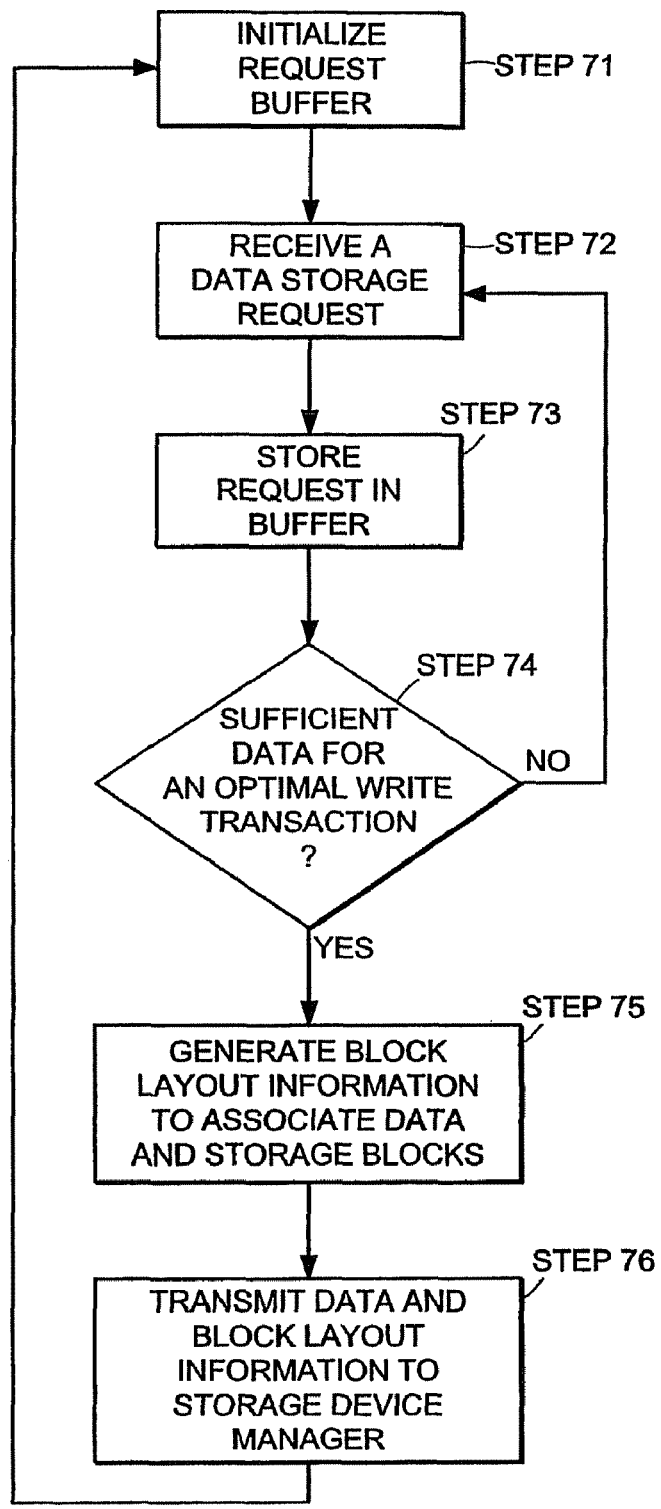
FIG. 4 is a flowchart of one embodiment of a method for controlling storage of data in an array of storage devices, as could be implemented by the storage system of FIG. 1.

FIG. 4 is a flowchart that illustrates an embodiment of a method for controlling storage of data in an array of storage devices, for example, as could be implemented by the file system 11 of the storage system 10 of FIG. 2. A request buffer 12 is initialized (Step 71), for example, by purging buffered requests after processing. Write requests 41 are received from clients 31 (Step 72), and buffered in the request buffer 12 (Step 73). Other write requests can be generated within the storage system, for example, for a mirror resynchronization. The write requests 41 can include data to be stored and/or references to data to be stored. A reference can include, for example, a pointer, and can include several levels of indirection. The data includes blocks of data, which correspond in size to storage blocks in the disk drives 21. The data can include data that fills only a portion of a block.

Eventually, a sufficient quantity of data blocks are buffered in the request buffer 12 for storage, or referred to by buffered references (Step 74). The sufficient quantity of data is determined according to one or more criteria. In one embodiment, a criteria is a sufficient size of a write transaction. For example, write requests 41 can be buffered until a write transaction having optimal chain lengths can be processed by the file system 11. Another criterion is exhaustion of available write buffers.

An embodiment of the invention logically groups write allocated buffers. The groupings of buffers may be implemented, for example, by the file system layer based on predetermined criteria. Criteria include, for example: the number or size of data blocks (to be written) buffered for a write transaction reaching a predetermined threshold selected to maintain low latency and/or a chain length sufficient to achieve efficient disk access; and the number of write buffers available reaching a predetermined low threshold.

When the RAID layer acts on these groups as individual units and bases its chained reads and writes on these groups, it will guarantee substantially optimal chain lengths. Thus, the file system and RAID layers cooperate in promoting optimized execution of write requests rather than performing their respective tasks independently, as was the case in known prior approaches.

In such prior approaches, the file system layer sent the RAID layer individual stripe writes and the RAID layer (which can be deemed for purposes hereof to include the disk drivers) used its own heuristics in determining how to combine reads and writes for multiple stripe writes to generate longer chained reads and writes. Such an approach typically fell short of optimal and the results were also non-deterministic.

The file system 11 generates block layout information 15 that associates the data blocks with unallocated storage blocks in a group of storage blocks in the disk drive array 20 (Step 75). The block layout information 15 can be, for example, an association between data blocks and free storage blocks in the group of storage blocks.

In one embodiment, the block layout information specifies (a) those storage blocks by DBN and the identity of the disks to which data blocks will be written, and (b) the lowest and highest offset stripes involved in the write.

Implementations for generating block layout information should attempt to realize the following key objectives: 1) consecutive blocks within a file (which is intended to picking consecutive free blocks on a disk to lay out increase read ahead performance of the file in subsequent read I/O transactions); (2) writing out full stripes, so that the RAID layer can compute and update parity efficiently; 3) providing the RAID layer with large chain lengths for writes; and 4) using up all free blocks so that the file system space can be fully utilized.

It should be noted that objectives (1) and (2) can conflict with each other since writing to consecutive disk blocks means allocating to blocks within the same disk and writing out full stripes means allocating across a RAID group. To balance these two requirements, the file system layer may limit the number of blocks of a file that it write allocates on a particular disk to a predetermined number and then, when that threshold has been met, it may select another disk for further write allocation. Also objective (3) can conflict with objective (4) since the allocation of a particular free block can result in non-optimal chain length. Therefore, a designer can develop an implementation that prioritizes these objectives at the expense of compromising their realization when they are in conflict.

One exemplary implementation for achieving these objectives will now be described. In this implementation, write allocation in the file system layer is performed one file at a time, and, for each file, buffers "belonging" to the file are allocated in the order of block numbers within the file ("FBN"). The steps are as follows:
1) Selecting the next file to write allocate.
2) Selecting the disk with the lowest free DBN relative to a certain base offset that has been chosen to allocate to regions thereof with more empty space. Such a determination of relative emptiness may be made by several alternative means. In this implementation, the file system layer maintains a count of free blocks for each region of the disks. This set of counts can be searched to find a relatively empty region.
3) Allocating the next buffer of the current file to the next lowest free DBN of the selected disk.
4) Checking if a "full" block layout has been write allocated. A "full" block layout is defined as the allocation of all free blocks in a predetermined range of stripes. If so, block layout information is dispatched to the RAID layer.
5) Repeating (3) and (4) until there are no more buffers for the current file or the FBN reaches a certain predetermined boundary, and otherwise, proceeding to step (6).
6) If the current file has more buffers, proceeding to step (2) and, otherwise, if there are more files to write allocate, proceeding to step (1). If no more files are left, the algorithm ends.

Note that this implementation prioritizes filling the available space over providing maximal write chain lengths in all cases. Alternative implementations may do the opposite and give preference to maximizing chain lengths. However, even in this implementation, good chain lengths are achieved because the write allocator preferentially picks areas of RAID groups that have more empty space. It follows that, if a block is picked for a write allocation in a disk region with a lot of empty space, according to the above algorithm, subsequent neighboring blocks will be picked to write allocate subsequent blocks of the file.

Returning to FIG. 4, after generating the block layout information 15, the method then executes a write of the buffered data blocks to the associated storage blocks pursuant to the layout information 15 by executing, for example, chained writes to multiple stripes (Step 76). In particular, the method provides writes that store at least some data blocks on a single disk drive while writing other related data blocks to storage blocks on other disk drives, preferably within the same stripes. Thus, advantages of writing to storage blocks on the same drive and to storage blocks within a stripe can be realized. The data blocks are transmitted to the disk drive array 20, for storage of the data blocks at the group of storage blocks according to the block layout information 15 (Step 76). The RAID layer thus receives a complete write transaction I/O request having optimal chain lengths for writes.

Thus, the storage system 10 can process a write of buffered data blocks to a two-dimensional group of storage blocks that includes contiguous stripes in a RAID array. Further, parity calculation overhead can be reduced by optimizing chain reads. Moreover, in a preferred embodiment, the RAID layer utilizes the block layout information 15 to select a parity calculation method and to organize maximized chain lengths for reads required for parity calculations.

Referring now to FIGS. 5-9, implementations of the method of FIG. 4 are described. For simplicity, parity drives are not shown or are shown in phantom. FIG. 5 illustrates one embodiment of a RAID 4 array 20A of disk drives. It will be apparent to one of skill in the art that features of the invention can be implemented in storage systems with other RAID configurations. The array 20A includes four disk drives (labeled 1 through 4) for storing data blocks, and a fifth drive for parity data (shown in phantom). Storage blocks in the disk drives are identified by storage block numbers. Storage blocks that are presently allocated are indicated with an "X". Remaining free storage blocks are available for storage of data blocks.

Responsive to topology information and block allocation information received from the RAID layer, unallocated storage blocks are selected in the array 20A for storage of a corresponding number of data blocks associated with buffered write requests. Preferably, the unallocated blocks are selected to fill free blocks in an optimal number of stripes of the array 20A.

Thus, stripes to which the write requested data will be written include a group of storage blocks, in this example, a two-dimensional array of storage blocks. One dimension, a column dimension, corresponds to a disk drive number. The other dimension, a row dimension, corresponds to a storage block number.

FIG. 6 illustrates another embodiment of a group 120 of storage blocks, which includes four stripes of sixteen total storage blocks to process a single write transaction for the file system 11. The group 120 has 14 free storage blocks. 14. Buffered write requests 41 for the write transaction provide 14 data blocks for association with the group 120 via block layout information. The data blocks and the association are transmitted to, and processed by, the disk array manager 13 so that each data block is stored at its associated storage block in the group 120.

Figures 7, 8:
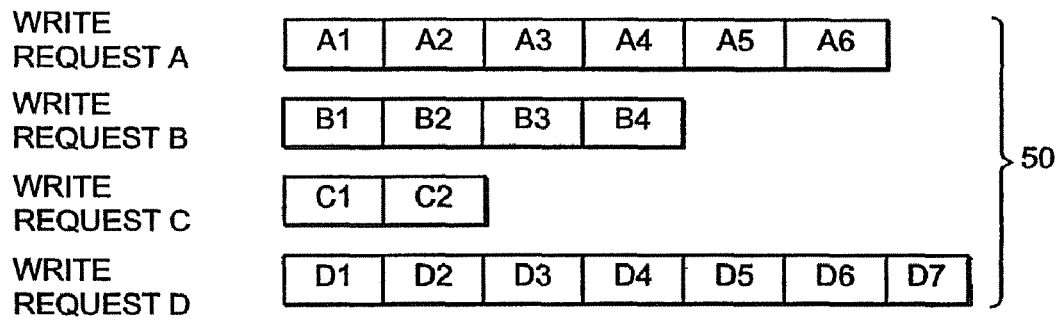
FIG. 7 is a block diagram of one embodiment of four buffered write requests.
FIG. 8 is a block diagram of one embodiment of an association between the data blocks of FIG. 6 and a group of storage blocks in a disk drive array.

A specific example of a write transaction for storage of data blocks associated with four write requests 41 at a group of storage blocks is described with reference to FIGS. 7 and 8. FIG. 7 illustrates four buffered write requests 50. Write request A includes data blocks A1 through A6. Write request B includes data blocks B1 through B4. Write request C includes data blocks C1 and C2. Write request D includes data blocks D1 through D7. The four buffered requests 50 provide data blocks, in this example, 19 data blocks, for storage at a group of storage blocks.

FIG. 8 illustrates block layout information 15, in this example an association 15A, between the data blocks of FIG. 7 and a group of storage blocks in the disk drive array 20. The group includes six stripes in the array 20, which provide 19 free blocks for one-to-one association with the 19 data blocks of the buffered write requests 41. The storage system 10 then directs a write to multiple stripes, filling the free blocks in the group. In alternative embodiments of an association 15A, not all free storage blocks in the group of storage blocks are associated with buffered data blocks.

The final transfer of data to free storage blocks in the group of storage blocks, as mediated by the disk array manager 13, for example, a RAID layer, can proceed via simultaneous writes to each disk drive, with multiple storage blocks being written on each drive. Thus, a write process can include simultaneous storage of data at multiple stripes.

The disk array manager 13 is configured to interpret and execute such write requests. In contrast, prior art RAID systems typically process writes one stripe at a time, and a typical prior art RAID interface would be unable to interpret a write command that associated data blocks with rows and columns of storage blocks in the array.

In preferred embodiments, the disk array manager 13 attempts to maximize chain lengths for writes. Unlike prior art systems, a RAID layer receives a write transaction request that includes block layout information 15 for a complete set of stripes. The disk array manager 13 need not wait for additional write requests to attempt to prepare optimal chain lengths for writing to disks 21.

The RAID layer can examine write transactions, as received from the file system 11. The RAID layer selects a parity calculation method, for example, subtraction-based or recalculation-based, for stripes to be written. The selections can be made, in part, to optimize realization of contiguous storage blocks for read operations, and to maintain a high degree of locality of reads or writes (i.e., reduce head seek time while accessing data of a disk), and to minimize usage of processor and memory resources. Chain lengths can be optimized for writing of data blocks corresponding to client 31 access requests, as described above for the preparation of block layout information 15. Moreover, a RAID layer can optimize reading performed for parity-related purposes by examining the block layout information 15 to select one or more maximized chain lengths for the read.

Thus, the RAID layer uses both the selected parity calculation methods and the block layout information 15 received from the file system 11 for contiguous block determinations. Further, resource allocation can be optimized, including, for example, I/O resources and buffer resources.

Further, a file system 11 can associate a priority level with each write transaction. The disk array manager 13 can utilize the priority level in a determination of the scheduling of execution of the write transaction. For example, priority can be selected by a client 31, or priority can be given to internal system management processes.

Figure 9:
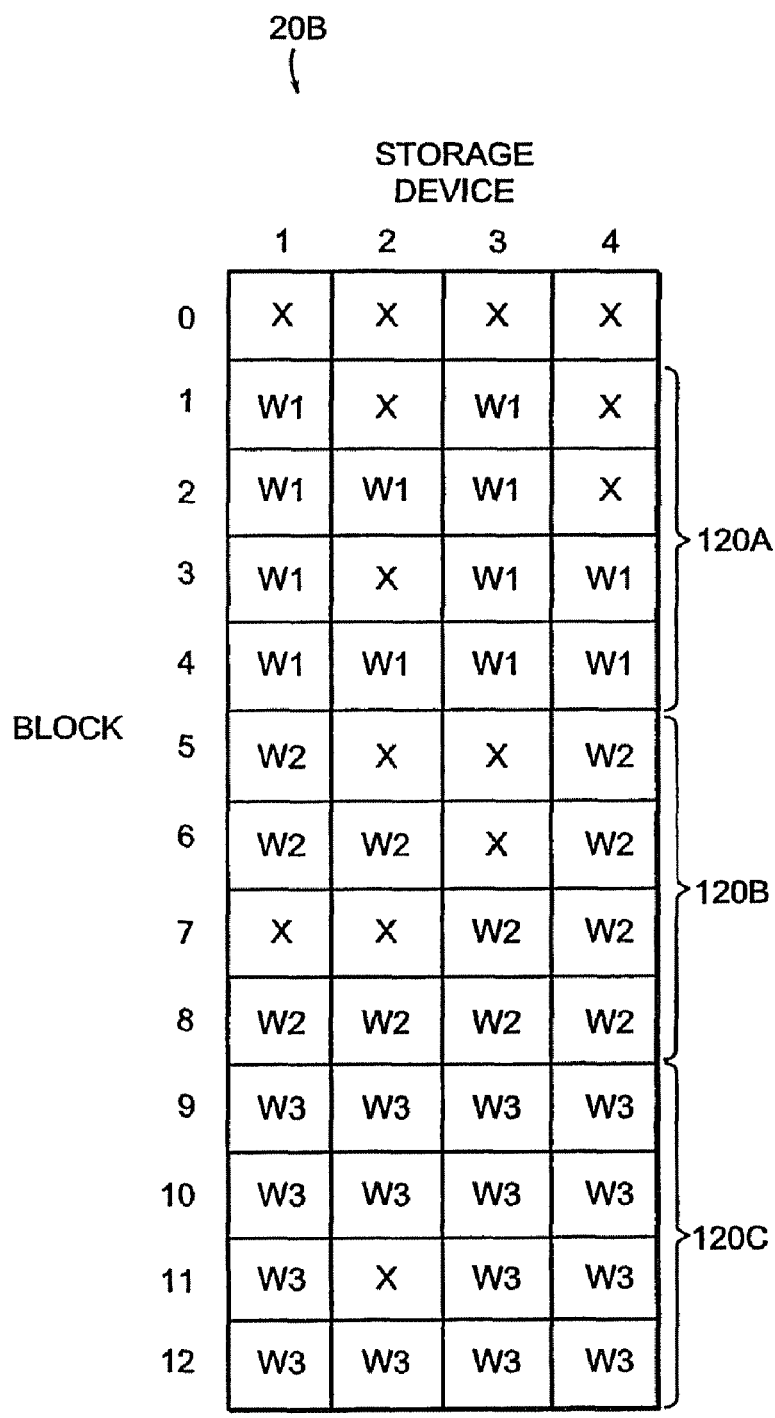
FIG. 9 is a block diagram of an embodiment of a disk drive array, which includes data blocks stored at three storage block groups.

FIG. 9 illustrates an embodiment of a disk drive array 20B, which has data blocks W1, W2, W3 stored at three storage block groups 120A, 120B, 120C. The three storage block groups 120A, 120B, 120C correspond to three write transactions created by the file system 11. In this embodiment, each storage block group 120A, 120B, 120C includes a four disk drive by four block group of storage blocks, i.e., 16 storage blocks. The data blocks W1, W2, W3 vary in number for each storage block group 120A, 120B, 120C because of variations in the number of unallocated storage blocks.

Each storage block group 120A, 120B, 120C begins with a stripe that includes a presently lowest-free-block (i.e., stripes 1, 5 and 9.) All unallocated storage blocks within each group of storage blocks are used for a write process, and each group of storage blocks includes a chain of consecutive unallocated storage blocks in each disk for the write process. Thus, all unallocated storage blocks tend to be filled as write requests are processed. Hence, storage space is efficiently utilized, related data blocks can be written to and read from a single or restricted number of disk drives, and parity calculation overhead can be minimized.

In preferred embodiments, the lowest numbered stripe for a group is chosen as the stripe possessing a free block having the lowest value, i.e., block number, of any free block (block number 1 in the embodiment of FIG. 5, block numbers 1, 5 and 9 in the embodiment of FIG. 9.) Further, in preferred embodiments, all unallocated storage blocks in each stripe of a group of storage blocks are utilized for storage. The lowest block number can correspond to a lowest-free-block offset value, as described above.

It will be apparent, however, to one of skill in the RAID storage arts, that features of the invention can be implemented by defining the origin of a group at an alternate location. For example, a group of storage blocks for processing of a write operation can be chosen from a set of contiguous stripes having no allocated storage blocks. Further, features of the invention can be implemented without storing data blocks at every unallocated storage block in a group of storage blocks. Moreover, situations can occur in which insufficient data blocks are available to completely fill a group of storage blocks, or fractional data blocks must be stored.

The disk array 20 can include more than one RAID group. In preferred embodiments, the RAID groups function separately, i.e., independently. Each write process, i.e., each write for buffered requests to a group of storage blocks, is performed within a single RAID group. Thus, by separating RAID groups, each RAID group can handle a write process at the same time as other RAID groups.

Preferably, each RAID group has an independent base block, and a current lowest-free-block. A lowest-free-block offset for each RAID group can be defined as the block number difference between the lowest-free-block and the base block for each RAID group. The next write location in a RAID group is determined by the lowest free block, to achieve, in part, efficient utilization of storage space.

Further, to choose a RAID group for a next write process, the offset of the lowest-free-block relative to the base block can be determined for each RAID group. The RAID group presently having the smallest offset is selected for the next write process. Each RAID group can operated independently of each other.

Figure 10:
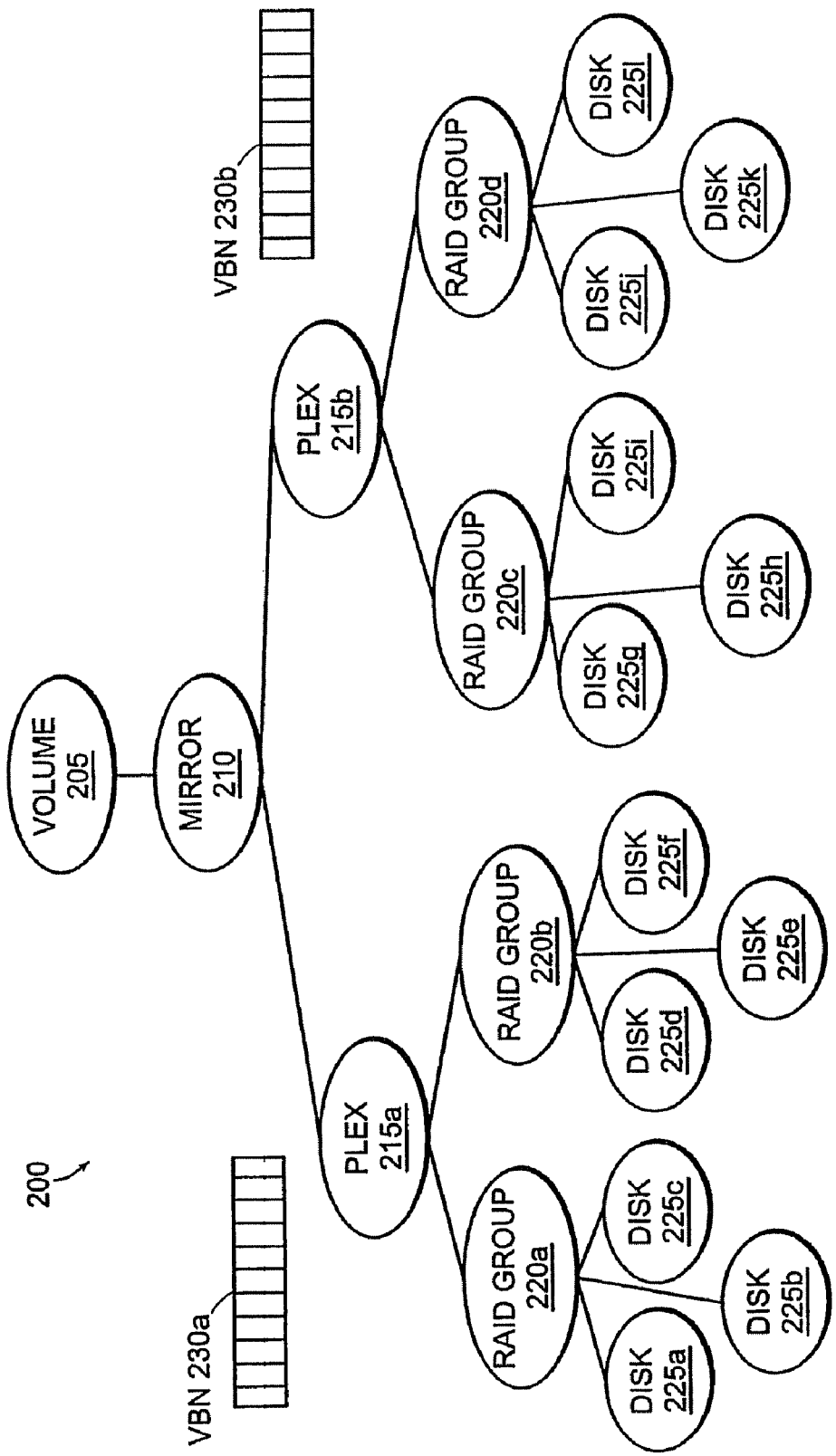
FIG. 10 is a block diagram of one embodiment of a logical grouping of an embodiment of a RAID array that includes mirroring.

FIG. 10 illustrates the logical grouping of an embodiment of a RAID array that includes mirroring. The logical grouping is appropriate, for example, to object-oriented software implementations of features of the invention. The logical grouping can be implemented, for example, by the disk array manager 13. The RAID array includes a set of logical objects 200 that represent a collection of disk drives in a hierarchical structure. The set of objects 200 includes a volume object 205, a mirror object 210 and plex objects 215a, 215b. The set of objects 200 further includes RAID group objects 220a, 220b, 220c, and 220d, and disk objects 225a, 225b, 225c, 225d, 225e, 225f, 225g, 225h, 225i, 225j, 225k, 225l.

The set of objects 200 is arranged as a hierarchical tree, with the volume object 205 as a root node. The file system 11 interacts with the volume object 205 via the disk array manager 13. The term "object" can refer to object-oriented software objects, or, more generally, to abstract entities representing a logical combination of physical devices (i.e., disks) to help define operational behaviors.

The illustrative embodiment represents a hybrid RAID level. The RAID group objects 220a, 220b, 220c, 220d represent a RAID level 4 implementation, striping data on two disks (e.g., 225a and 225b) with a third parity disk (e.g., 225c). The mirror object 210 represents a RAID level 1 implementation. The inventive techniques, however, are not limited to this implementation and other RAID levels and hybrid RAID levels can similarly be represented by a set of objects. Likewise, symmetry between the plex objects 215 is not required. While the illustrated embodiment has two plexes, the invention may be practiced alternatively with any number of plexes, as will be apparent to those skilled in the art.

A range of VBN's 230a, 230b are logical representations of the actual storage space located on a disk drive in the array. In one embodiment, a block size is 4 kilobytes. The range of VBN's 230a, 230b is determined in a bottom-up approach and each object in the set of objects 200 has its associated range of VBN's. A RAID group object 220a, 220b, 220c, 220d is associated with the aggregate of the VBNs of its disk objects 225a, 225b, 225c, 225d, 225e, 225f, 225g, 225h, 225i, 225j, 225k, 225l. For example, the VBN range of the RAID group 220a is the aggregate of the disk objects 225a, 225b and 225c. The plex objects 215a, 215b are associated with the aggregate of the VBN's of their RAID group objects 220a, 220b, 220c, 220d. For example, the VBN range of the plex object 215a is the aggregate of the RAID group objects 220a and 225b.

In this embodiment, because the mirror object 210 mirrors plex 215a onto plex 215b, or vice-versa, the VBN range of the mirror object 215 is not the aggregate of its plex objects 215a, 215b. Instead, the VBN range of the mirror object 210 is the union of the VBN's of its plex objects 215. Thus, if the implementation of the disks associated with each of the plex objects 215a, 215b is identical and the map of the ranges is identical, then the VBN ranges 230a, 230b are identical, and the VBN range of the mirror object 210 is identical to 230a. The VBN range of the volume object 205 is the VBN range of the mirror object 210.

Even if asymmetrical, the mirrored data needs to go into the same block numbers in each of the VBN's 230a and 230b. For example, data written into VBN's 0-10 of the VBN range 230a must be written into VBN's 0-10 of the VBN range 230b. In another embodiment, one plex has a larger VBN range than the other plex. The size of the VBN range of the mirror object 210 is that of the mirrored range of VBNs plus the non-mirrored VBNs.

The association of a range or ranges of VBN's to objects at each level is sometimes referred to as a RAID map. The disk array manager 13 sends disk configuration information 14 to the file system 11, the information including the RAID map of the set of objects 200. The file system 11 can thus understand the disk array topology and can allocate data to the VBN's to optimize disk writes and/or disk reads.

The file system 11 can use the disk topology information 14 for preparation of block layout information 15. The file system 11 can then formulate a write transaction as an object, which includes the block layout information 15 and the data for storage, and submit the object to the volume 205.

The file system 11 need not be aware of the existence of the mirror 210. The mirror object 210, or layer, of the volume 205 determines how to direct the access request received from the file system 11. Mirrored writes are performed within each plex 215a, 215b. For efficiency, parity determinations may be performed only in one of the plexes 215a, 215b, with the results shared with the other plex 215a, 215b, provided the plexes have the same RAID group layout, the parity calculation is performed in the same way, and the data on both plexes are the same. Otherwise, parity determinations may be performed for each of the plexes.

For example, the file system 11 can formulate an access request, i.e., a write object, to write buffered data blocks to the volume 205 in a VBN range of 26 to 29. The mirror 210 can then create two, mirrored write objects, one for each side of the mirror, i.e., each plex 215a, 215b. In one plex 215a, 215b, reads of storage blocks in the VBN range of 26 to 29 will occur to support parity determinations, while the other plex 215a, 215b need only process writes to storage blocks. The mirror 210 can be implemented with a single disk drive or over multiple disk drives.

The two write objects thus have a master/slave relationship, with the master responsible for parity determinations. For such an implementation, the VBN ranges of the two sides of the mirror are preferably identical.

Figure 11:
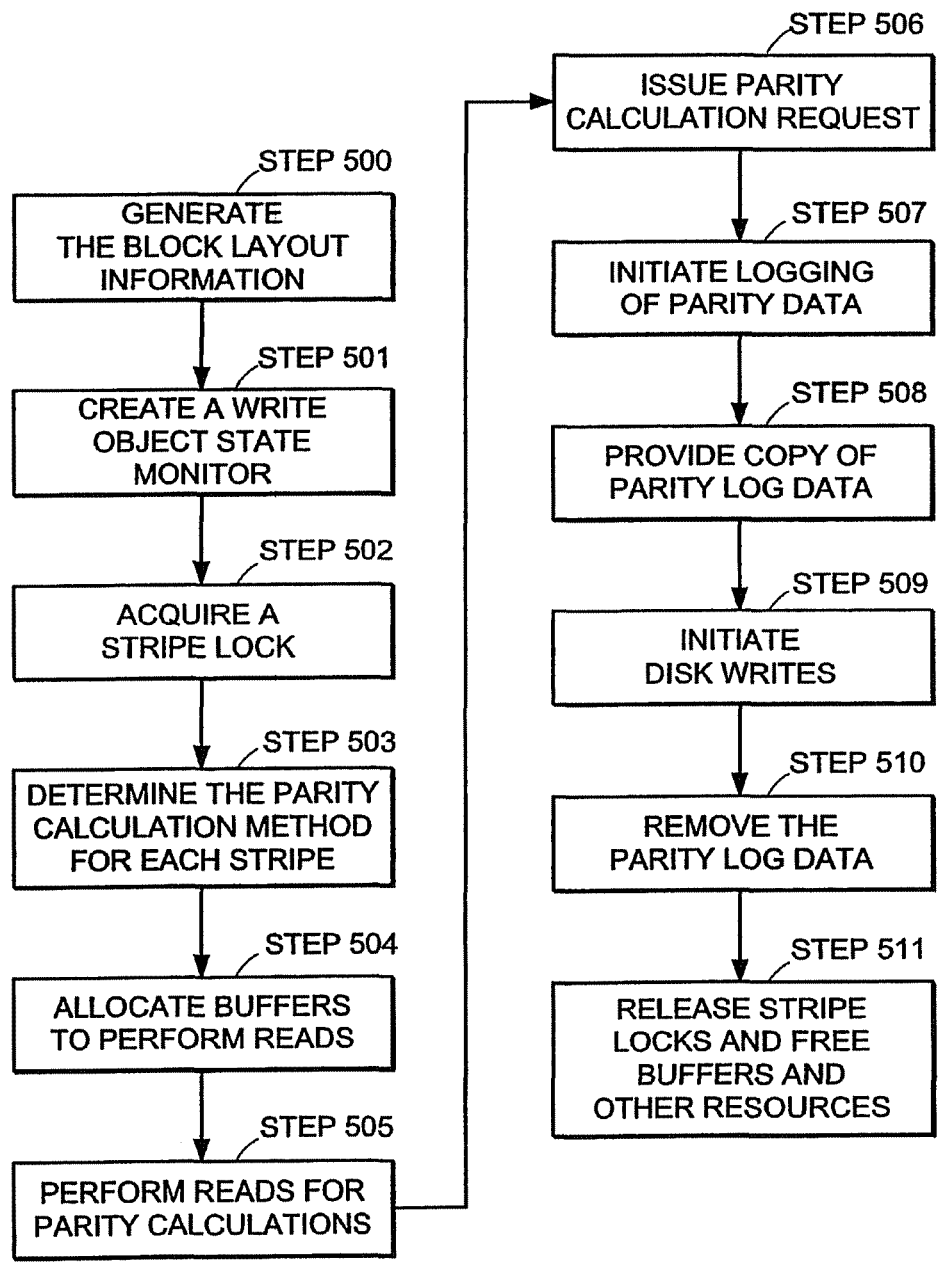
FIG. 11 is a flowchart of an embodiment of a method for processing data writes, as could be implemented with the array of FIG. 10.

FIG. 11 is a flowchart of another embodiment of a method for processing write transactions received from the file system 11 by the disk array manager 13, which in this embodiment is a RAID layer. The method can be implemented by a RAID layer in communication with the storage array of FIG. 11. For purposes of FIG. 11, the storage array shall be described as a non-mirrored configuration. The method includes the following steps:

Step 500) Generate, by file system 11, the block layout information 15 preferably with maximized chain lengths for data writes to the disks 21.

Step 501) Create an instance of a write object state monitor to hold information regarding the write object and resources allocated thereto, and confirm that the RAID group is online and available to service the write transaction. One embodiment of a write object state monitor is a array_write I/O task, as described in the co-pending, commonly assigned Patent Application filed on even date herewith by Srinivasan Viswanathan et al., entitled "Method and Apparatus for Decomposing I/O Tasks in a RAID System", the disclosure thereof being incorporated herein by reference.

Step 502) Acquire a stripe lock for the range of stripes corresponding to the block layout information 15. A "stripe lock" refers to the grant of a lock by a resource manager in response to a lock request e.g., made by a RAID layer, to restrict access to the group of storage blocks prior to storing the data. When a lock is granted, it can be mandatory or advisory, and will tend to preclude concurrent access by other write transactions to the restricted storage blocks. If the lock cannot be immediately granted (e.g., if another write transaction is in progress to at least some of the same storage blocks), the write transaction is suspended until such time as a lock may be granted.

Step 503) For each stripe, determine the parity calculation method, as described above, and identify all blocks that need to be read to support the calculation. If the storage array is a mirrored configuration, prior to performing the foregoing step, this method would perform the step of determining the identity of the RAID array responsible for calculating parity, and then that array performs this parity calculation determining step. The responsible array in a mirrored configuration also performs the following steps 504-508.

Step 504) Allocate buffers for the reads needed to support the parity calculation (the data buffers containing the data to be written having already been allocated by the file system layer).

Step 505) Perform reads in support of parity calculations, as described above.

Step 506) Issue a parity calculation request to a thread or other processing entity that is responsible for the calculation of stripe parity data.

Step 507) Initiate logging of parity data to non-volatile storage, including task-specific intermediate state information, to allow for recovery in case of loss of parity data or to make parity data consistent.

Step 508) Upon completion of logging per step 507, if mirroring of the non-volatile storage is provided by the system configuration, provide a copy of the parity log data to the non-volatile storage mirror.

Step 509) Initiate disk writes to the range of stripes corresponding to the block layout information 15 and the parity data, preferably via chained writes. If the storage array were a mirrored configuration, prior to performing this initiation of disk writes step, the responsible array indicates to the slave array that it can proceed to step 509 on behalf of its copy of the mirror data. Then, each of the RAID arrays initiates disk writes to its data blocks pursuant to this step.

Step 510) Remove the parity log data for stripes once the data write has been completed successfully (and such data in the non-volatile storage mirror, if used). If the storage array is a mirrored configuration, then the data writes for both arrays must be completed successfully prior to performing this step.

Step 511) Release stripe locks and free any buffers and other resources allocated to the write transaction.

Some alternative embodiments of a method for processing write transactions received from the file system 11 by the disk array manager 13 are similar to the above method, but vary the collection of steps that occur and/or the sequence of such steps.

Figure 12:
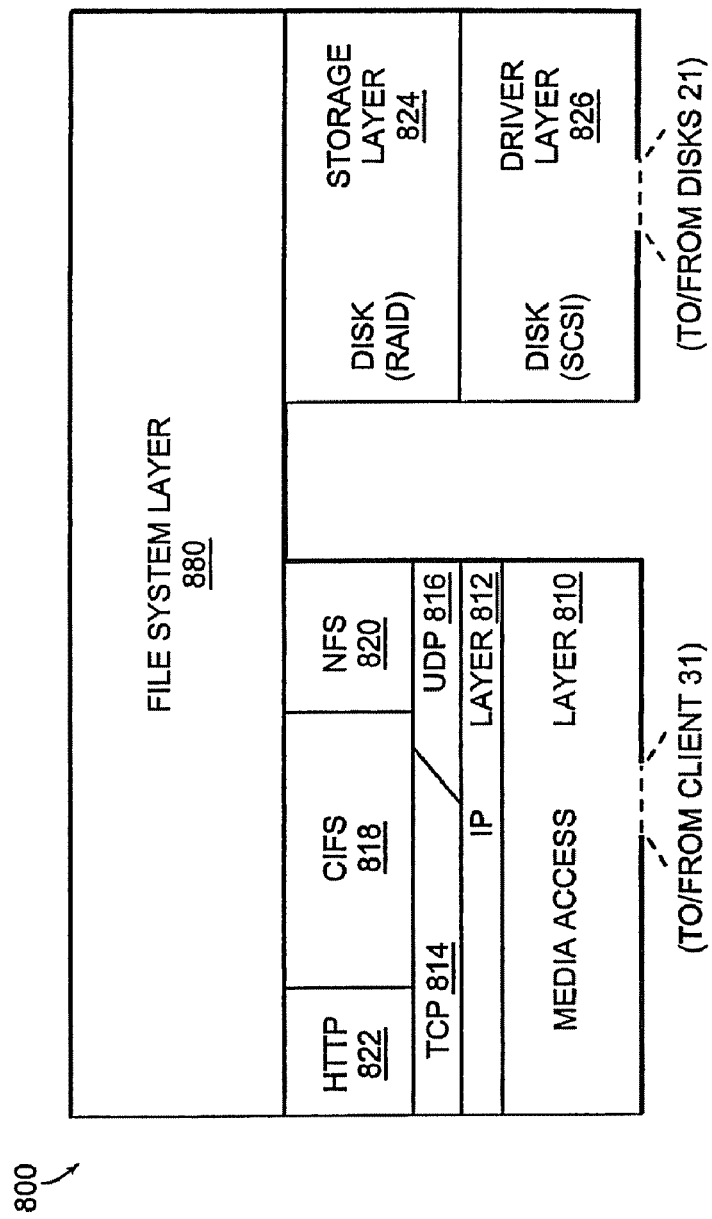
FIG. 12 is a block diagram of an embodiment of a storage operating system that can be included in the storage system of FIG. 1.

Referring to FIG. 12, some embodiments of file systems 11 of the invention are implemented as a modification of a write-anywhere file system. One such file system, suitable for modification according to features of the invention, is the "WAFL" file system that is part of a storage operating system, as described in commonly assigned U.S. Pat. No. 6,038,570.

Referring now to FIG. 12, in one embodiment the server interacts with storage devices in, for example, a network-attached storage environment, a storage area network, and/or a disk assembly directly attached to a client or host computer.

FIG. 12 is a schematic block diagram of an embodiment of a storage operating system 800 that may be advantageously used within the storage system 10. The storage operating system 800 comprises a series of software layers, including a media access layer 810 of network drivers (e.g., an Ethernet driver). The operating system 800 further includes network protocol layers, such as the Internet Protocol (IP) layer 812 and its supporting transport mechanisms, the Transport Control Protocol (TCP) layer 814 and the User Datagram Protocol (UDP) layer 816.

The storage operating system 800 includes a file system protocol layer that provides multi-protocol data access, and includes support components for the Common Internet File System (CIFS) protocol 818, the Network File System (NFS) protocol 820 and the Hypertext Transfer Protocol (HTTP) 822. A file system protocol layer can also include, for example, support for the Direct Access File System (DAFS) protocol.

The storage operating system 800 further includes a disk storage layer 824 (i.e., a RAID layer) that implements a disk storage protocol, such as a RAID protocol, and a disk driver layer 826 that implements a disk access protocol such as, e.g., a Small Computer Systems Interface (SCSI) protocol. The disk storage (RAID) layer 824 can, for example, be implemented by some embodiments of the disk array manager 13.

Bridging the disk software layers with the network and file system protocol layers is a file system layer 880 that that is implemented by some embodiments of the file system 11. The on-disk format representation of the file system 11 is block-based using, e.g., 4 kilobyte (kB) blocks. Though some embodiments include a variable block size, use of a fixed block size generally provides greater storage system flexibility.

In one embodiment, a read request from a client 31 is forwarded as, e.g., a conventional CIFS or NFS protocol packet over the computer network and onto the storage system 10 where it is received at the network adapter 310. A network driver of the media access layer 810 processes the packet, passes it onto the network protocol layers 812, 814, 816 and CIFS or NFS layer 818, 820 for additional processing prior to forwarding to the file system layer 880.

The file system 11 generates operations to load (retrieve) the requested data from a disk 21 if it is not resident in memory, e.g., memory 310. If the information is not in memory, the file system layer 880 retrieves a VBN. The file system layer 880 then passes the VBN to the disk storage (RAID) layer 824, which maps that logical number to a disk block number and sends the latter to an appropriate driver (e.g., SCSI) of the disk driver layer 826. The disk driver accesses the disk block number from disk 21 and loads the requested data block(s) in memory 320, 331 for processing by the storage system 10. Upon completion of the request, the storage system 10 returns a reply to the client 31 over the network.

It should be noted that the software "path" through the storage operating system layers described above needed to perform data storage access for the client request received by the storage system 10 may alternatively be implemented in hardware. That is, in an alternate embodiment of the invention, the storage access request data path can be implemented, e.g., as logic circuitry embodied within a field programmable gate array (FPGA) or an application specific integrated circuit (ASIC). This type of hardware implementation increases the performance of the file service provided by storage system 10 in response to a file system request packet issued by client 31.

Moreover, in another alternate embodiment of the invention, the processing elements of adapters 310, 340 may be configured to offload some or all of the packet processing and storage access operations, respectively, from the processor 320, to thereby increase the performance of the storage system 10. It is expressly contemplated that the various processes, architectures and procedures described herein can be implemented in hardware, firmware or software.

As used herein, the term "storage operating system" generally refers to the computer-executable code operable on a storage system that manages data access and, in the case of file servers, may implement file system semantics. The invention should not be deemed to be limited to file servers, however. A storage operating system can be implemented as a microkernel, and include the file system layer 880 to implement the file system 11 semantics and manage data access. The storage operating system can also be implemented as an application program operating over a general-purpose operating system, such as UNIX or WINDOWS NT, or as a general-purpose operating system with configurable functionality, which is configured for storage applications as described herein.

In addition, it will be understood by those skilled in the art that the inventive techniques described herein may apply to any type of special-purpose (e.g., server) or general-purpose computer, including a standalone computer or portion thereof, embodied as a storage system. The file system layer and the RAID layer (or components thereof) can be implemented on the same computer system or on separate computer systems in communication with one another. The same can be said of the layout information generator and the storage device manager (or components thereof). The storage operating system can run on a single computer system or device or be distributed to run on a plurality of computer systems or devices. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for managing storage of data in a plurality of storage devices operatively connected to a computer, each storage device having a plurality of blocks for storing data, comprising:
   generating block layout information of a storage operating system executing on the computer by determining which blocks within the plurality of blocks are allocated for storing data and which are unallocated;
   responsive to the block layout information, controlling the execution of I/O operations generated by the storage operating system by identifying a plurality of contiguous blocks within the plurality of blocks for use by the I/O operations so as to substantially maximize chain lengths of read operations for calculation of parity;
   determining whether a parity subtraction method or a recalculation method requires a fewest number of read operations to calculate parity for the I/O operations;
   selecting the parity subtraction method or the recalculation method for parity calculation based on which method requires the fewest number of read operations; and
   responsive to the block layout information and the parity calculation method selected, identifying the contiguous blocks within the plurality of blocks for use by the I/O operations.

2. A method for managing storage of data in a plurality of storage devices operatively connected to a computer, each storage device comprising a plurality of storage blocks, comprising:
   generating block layout information of a storage operating a system executing on the computer by determining which blocks within the plurality of storage blocks are allocated for storing data and which are unallocated;
   determining whether a first methodology or a second methodology requires a fewest number of read operations to calculate parity for I/O operations generated by the storage operating system; and
   in response to the block layout information and the determination, controlling execution of I/O operations by identifying a plurality of contiguous storage blocks of the plurality of storage blocks for use by the I/O operations so as to minimize a number of read operations needed for calculation of error correction parameters across a stripe disposed among the plurality of storage devices.

3. The method of claim 2 wherein the calculation of error correction parameters comprises the calculation of parity.

4. The method of claim 2 wherein a subtraction method is the first methodology and a parity re-calculation method is the second methodology.

5. The method of claim 2 wherein the identification of the plurality of contiguous storage blocks for use by the I/O operations maximizes a chain length by maximizing a number of blocks of the plurality of storage blocks having a contiguous physical layout on a first single storage device of the plurality of storage devices.

6. The method of claim 2, further comprising:
   identifying the plurality of the contiguous storage blocks for use by the I/O operations so as to maximize a chain length by maximizing a number of blocks of the plurality of storage blocks having sequential volume block numbers (VBNs) associated with the plurality of storage blocks.

7. The method of claim 2, further comprising:
   identifying the plurality of the contiguous storage blocks for use by the I/O operations so as to maximize a chain length by maximizing locality of the plurality of contiguous blocks of a first storage device of the plurality of storage devices.

8. The method of claim 2 wherein controlling execution comprises:
   examining the plurality of storage blocks to which data is to be written; and
   selecting either,
      the first methodology comprising minimizing a number of blocks read, or
      the second methodology comprising maximizing chain lengths of blocks read for calculating parity.

9. The method of claim 8, wherein controlling execution further comprises:
   implementing the selection of the first or second methodology responsive to the block layout information;
   wherein, if the first methodology is selected,
   determining on a stripe-by-stripe basis whether to calculate parity based on a subtraction method or a recalculation method,
   performing a number of read operations of the plurality of storage blocks, and
   calculating parity responsive to the number of blocks read and the data to be written; and wherein, if the second methodology is selected,
deciding which storage blocks to read to maximize chain length while minimizing the number of blocks read to support either the subtraction method or the recalculation method,
performing read operations on the number of blocks to be read, and
calculating parity responsive to the number of blocks read and the data to be written.

10. The method of claim 2, wherein identifying the contiguous of storage blocks is based at least in part on an available resource of the computer.

11. The method of claim 2 further comprising transmitting the block layout information from a file system layer of the computer to a RAID layer of the computer.

12. The method of claim 2 wherein generating further comprises:
making a first determination as to whether a storage block of the plurality of storage blocks is unallocated;
making a second determination as to a current implementation of the plurality of storage devices; and
generating the block layout information based at least in part on the first and the second determinations.

13. The method of claim 2, wherein at least one of the I/O operations comprises a read operation.

14. The method of claim 5, wherein the chain length is a chain length of a read operation for calculation of parity.

15. The method of claim 5, wherein the chain length is a chain length for a write operation for the data.

16. A method for managing storage of data in a storage system, comprising:
maintaining a plurality of storage devices of the storage system, each storage device having a plurality of storage blocks; and
writing data to predetermined storage blocks of the plurality of storage blocks across a plurality of stripes and to predetermined contiguous storage blocks within the plurality of storage devices so as to maximize chain lengths of the predetermined contiguous storage blocks and minimizing a number of read operations for the calculation of error correction parameters across the plurality of stripes by determining whether a parity subtraction method or a recalculation method requires a fewest number of read operations to calculate parity, and selecting the parity subtraction method or the recalculation method for parity calculation based on which method requires the fewest number of read operations.

17. A storage system, comprising:
a storage adapter configured to couple the storage system to a plurality of storage devices, each storage device having a plurality of storage blocks; and
a storage manager in communication with the plurality of storage devices, the storage manager configured to write data to predetermined storage blocks of the plurality of storage blocks across a plurality of stripes and to predetermined storage blocks within the plurality of storage devices so as to maximize a chain length of the plurality of storage blocks by selecting contiguous storage blocks within a first storage device of the plurality of storage devices while minimizing a number of read operations required for calculation of error correction parameters across the plurality of stripes by determining whether a parity subtraction method or a recalculation method requires a fewest number of read operations to calculate parity and selecting the parity subtraction method or the recalculation method for parity calculation based on which method requires the fewest number of read operations.

18. A system for managing data storage, comprising:
a plurality of storage devices operatively connected to a computer, each storage device having a plurality of storage blocks;
a storage device manager of the computer in communication with the plurality of storage blocks;
a block layout information generator of the computer in communication with the storage device manager and the plurality of storage blocks; and
an error correction parameter calculator of the computer in communication with the plurality of storage blocks and the storage device manager,
wherein the storage device manager, in response to block layout information from the block layout information generator, controls execution of an I/O operation by identifying a plurality of contiguous storage blocks on one or more storage devices of the plurality of storage devices for use by the I/O operation so as to maximize a chain length within the one or more storage devices while minimizing a number of read operations required by the error correction parameter calculator to calculate error correction parameters across a stripe of the one or more storage devices by determining whether a parity subtraction method or a recalculation method requires a fewest number of read operations to calculate parity for the I/O to operations and select the parity subtraction method or the recalculation method for parity calculation based on which method requires the fewest number of read operations.

19. A method for managing storage of data by a computer, comprising:
receiving a request to write the data to a plurality of storage devices connected to the computer;
generating block layout information to determine which blocks within a plurality of blocks of the plurality of storage devices are allocated and which are unallocated;
identifying one or more blocks of the plurality of blocks from the blocks layout information for use by a set of I/O operations;
determining a first number of read operations needed to calculate parity for the data by calculating parity using a subtraction method;
determining a second number of read operations needed to calculate parity for the data by calculating the parity using a recalculation method;
determining which method requires a fewer number of read operations, and choosing the method that requires the fewer number of read operations; and
writing the data to the identified one or more blocks, and calculating the parity for the data using the chosen method.

20. The method of claim 19, further comprising:
choosing to either maximize chain lengths for calculating the of parity or choosing to place the data with a high degree of locality in the plurality of storage devices for calculating the parity.

21. A method for managing storage of data by a computer, comprising:
receiving a request to write data to a plurality of storage devices operatively connected to the computer;
generating block layout information to determine which blocks within a plurality of blocks of the plurality of storage devices are allocated and which are unallocated;

identifying the unallocated blocks for use by a set of I/O operations to store the data;

determining, in response to the blocks layout information, whether a first method to minimize a number of read blocks or whether a second method to maximize chain lengths of read blocks requires a fewer number of read operations, and selecting one of the first method and the second method that requires the fewer number of read operations responsive to the determining and responsive to the block layout information, and writing the data to the plurality of storage devices using the selected method.

22. The method of claim 21, further comprising:

in response to selecting the first method, determining whether a subtraction method to calculate parity or whether a recalculation method to calculate the parity requires the fewer number of read operations; and performing the write operation and calculating the parity using one of the subtraction method and the recalculation method that requires the fewer number of read operations.

23. The method of claim 22, further comprising:

in response to selecting the second method, deciding which storage blocks to read to maximize chain lengths while minimizing the number of storage blocks read to support one of subtraction method to calculate parity and a recalculation method to calculate the parity; and performing the write operation and calculating the parity using one of the subtraction method and the recalculation method that requires the fewer number of read operations.

24. A method for managing storage of data by a computer, comprising:

receiving a request to write data to a plurality of storage devices operatively connected to the computer;

generating block layout information to determine which blocks within a plurality of blocks of the plurality of storage devices are allocated and which are unallocated;

identifying one or more unallocated blocks for use by a set of I/O operations to store the data;

testing to either maximize chain lengths of read operations for calculation of parity, or testing to place the data with a high degree of locality in the plurality of storage devices, the testing comprising, determining, for both maximizing chain lengths and placing the data with the high degree of locality, a number of read operations needed to calculate parity for the data, by calculating parity using both a subtraction method of calculating parity and a recalculation method of calculating parity;

first choosing to either maximize chain lengths of read operations for calculation of parity or to place the data with the high degree of locality in the plurality of storage devices, and after the first choice, secondly choosing either the subtraction method of calculating parity or the recalculation method of calculating parity by determining which of these methods requires a fewest number of read operations, choosing the method which requires the fewest number of read operations of calculating parity of the data; and writing the data to the identified blocks, and calculating parity for the data using the chosen method.

25. A computer readable media, comprising:

said computer readable media containing instructions for execution on a processor for a method of managing storage of data in a plurality of storage devices, each storage device having a plurality of blocks for storing data, the method comprising, generating block layout information; and in response to the block layout information, controlling execution of an I/O operation to the plurality of storage devices by identifying a plurality of contiguous storage blocks on the plurality of storage devices so as to minimize a number of read operations for calculation of error correction parameters across a stripe of the plurality of storage devices by determining whether a parity subtraction method or a recalculation method requires a fewest number of read operations to calculate parity for the I/O operations and selecting one of the parity subtraction method and the recalculation method for parity calculation based on which method requires the fewest number of read operations.

* * * * *

UNITED STATES PATENT AND TRADEMARK OFFICE
CERTIFICATE OF CORRECTION

Page 1 of 2

PATENT NO. : 7,979,633 B2
APPLICATION NO. : 10/817212
DATED : July 12, 2011
INVENTOR(S) : Steven R. Kleiman It is certified that error appears in the above-identified patent and that said Letters Patent is hereby corrected as shown below:

In Col. 11, lines 28-29:
~~consecutive blocks within a file (which is intended to picking~~
picking consecutive free blocks on a disk to lay out consecutive blocks
within a file (which is intended to increase read In Col. 15, line 47:
225j, 225k, ~~2251~~ 225l. For example, the VBN range of the RAID In Col. 19, line 52:
responsive to the block layout information, controlling ~~the~~

In Col. 20, line 6:
~~a~~ system executing on the computer by determining

In Col. 20, line 31:
contiguous physical layout on a first ~~single~~ storage device of In Col. 21, line 6:
performing read operations on the number of blocks ~~to be~~

In Col. 21, line 11:
tiguous ~~of~~ storage blocks is based at least in part on an avail- In Col. 22, line 30:
the I/O ~~to~~ operations and to select the parity subtraction In Col. 22, line 42:
from the ~~blocks~~ block layout information for use by a set of I/O Signed and Sealed this
Thirteenth Day of March, 2012

David J. Kappos
*Director of the United States Patent and Trademark Office*

CERTIFICATE OF CORRECTION (continued)
U.S. Pat. No. 7,979,633 B2

In Col. 22, line 58:
    the ~~of~~ parity or choosing to place the data with a high In Col. 23, line 3:
    determining, in response to the ~~blocks~~ block layout information, In Col. 23, line 22:
    23. The method of claim ~~22~~ 21, further comprising: